US012759945B2

(12) United States Patent
Zhang et al.

(10) Patent No.: US 12,759,945 B2
(45) Date of Patent: Oct. 13, 2026

(54) FABRICATION OF NEAR NET-SHAPED SILICON CARBIDE STRUCTURES

(71) Applicant: General Atomics, San Diego, CA (US)

(72) Inventors: Jiping Zhang, San Diego, CA (US); Jonas Opperman, San Diego, CA (US); George Jacobsen, Escondido, CA (US); Bunsen Wong, San Diego, CA (US)

(73) Assignee: GENERAL ATOMICS

( * ) Notice: Subject to any disclaimer, the term of this patent is extended or adjusted under 35 U.S.C. 154(b) by 264 days.

(21) Appl. No.: 18/365,115

(22) Filed: Aug. 3, 2023

(65) Prior Publication Data

US 2025/0042821 A1 Feb. 6, 2025

(51) Int. Cl.

*C04B 35/576* (2006.01)
*C04B 35/573* (2006.01)
(Continued)

(52) U.S. Cl.

CPC ...... *C04B 35/573* (2013.01); *C04B 35/63464* (2013.01); *C04B 35/638* (2013.01); *C04B 35/65* (2013.01); *C04B 38/0032* (2013.01); *C04B 2235/3418* (2013.01); *C04B 2235/3826* (2013.01); *C04B 2235/422* (2013.01); *C04B 2235/428* (2013.01)

(58) Field of Classification Search

CPC ................ C04B 35/565; C04B 35/573; C04B 35/62807; C04B 35/62884; C04B 35/63464; C04B 35/638; C04B 35/65; C04B 38/0032; C04B 41/009; C04B 41/4539; C04B 41/87; C04B 20/1033; C04B 35/591

See application file for complete search history.

(56) References Cited

U.S. PATENT DOCUMENTS 3,634,116 A 1/1972 Woerner et al.
4,325,930 A 4/1982 Vallet
(Continued)

FOREIGN PATENT DOCUMENTS

CN 111217616 A * 6/2020 ............ C04B 41/87
EP 0032097 B1 10/1984
(Continued)

OTHER PUBLICATIONS

CN111217616A—Machine Translation (Year: 2020).*
(Continued)

*Primary Examiner* — Yunju Kim
(74) *Attorney, Agent, or Firm* — Ashurst Perkins Coie US LLP

(57) ABSTRACT

A method of manufacturing a target structure is provided. The method includes: obtaining a model structure of an initial material composition having a predetermined geometry and dimensions; applying a slurry mixture into the model structure; and processing the model structure with the slurry mixture inside the model structure to convert the initial material composition of the model structure into a final material composition to obtain the target structure with the final material composition and having a geometry and dimensions that are substantially similar to the predetermined geometry and dimensions of the model structure.

20 Claims, 19 Drawing Sheets

100

(51) Int. Cl.

| | |
|---|---|
| ***C04B 35/634*** | (2006.01) |
| ***C04B 35/638*** | (2006.01) |
| ***C04B 35/65*** | (2006.01) |
| ***C04B 38/00*** | (2006.01) |

(56) References Cited

U.S. PATENT DOCUMENTS

| | | | | |
|---|---|---|---|---|
| 2005/0209088 | A1* | 9/2005 | Tani ...................... | C04B 35/573 501/88 |
| 2015/0251959 | A1 | 9/2015 | Goujard et al. | |
| 2021/0269366 | A1 | 9/2021 | Garnier et al. | |

FOREIGN PATENT DOCUMENTS

| | | | |
|---|---|---|---|
| EP | 1449819 | B1 | 7/2013 |
| EP | 2900623 | B1 | 9/2017 |

OTHER PUBLICATIONS

International Search Report and Written Opinion for International Patent Application No. PCT/US2024/040397, mailed Jan. 23, 2025 (20 pages).

Invitation to Pay Additional Fees for International Patent Application No. PCT/US2024/040397, mailed Nov. 28, 2024 (8 pages).

Wang et al., "Fabrication of Porous SiC Ceramics with Special Morphologies by Sacrificing Template Method", J. Porous Materials, 11: 265-271, 2004.

Vargas, "SiC Design Guide: Manufacture of Silicon Carbide Products," An Entegris Company, Mirror Technology Days, Jun. 7-9, 2010, available at https://nasasitebuilder.nasawestprime.com/xrcr/wp-content/uploads/ sites/42/2018/02/22-POCO-SiC-Design-Guide.pdf.

Frolova et al., "Properties of silicon carbide fibers obtained by silicification of carbon fiberic with SiO vapours," Ceramics International, 46(2020) 18101.

Zhang et al., "Microstructure and mechanical properties of porous SiC ceramics by carbothermal reduction and subsequent recrystallization sintering," J. Asian Ceramic Societies, vol. 8(2), 2020.

* cited by examiner

900

FABRICATION OF NEAR NET-SHAPED SILICON CARBIDE STRUCTURES

TECHNICAL FIELD

This patent document relates to silicon carbide materials and structures and associated fabrication methods.

BACKGROUND

High strength materials such as silicon carbide materials can be used in various applications, including fission or fusion nuclear reactors and other applications outside the nuclear power generation. For example, various nuclear reactors may use a fissile material contained within silicon carbide-based cladding as the fuel to generate power. Silicon carbide can also be used for flow channel inserts (FCI) in nuclear fusion reactor designs to generate power. For nuclear fission power reactors, the fuel is usually held within a robust physical container or fuel rods capable of enduring high stresses, elevated operating temperatures and an intense neutron radiation environment. Fuel container or fuel rod structures are required to maintain their shape and integrity within the reactor core over a period (e.g., several years), thereby preventing the leakage of fission products into the reactor coolant or leakage of coolant from a fusion blanket.

SUMMARY

This patent document includes a technology and its implementations for providing methods and processes for fabricating silicon carbide structures using preformed carbon foam structures and for forming densified silicon carbide structures suitable for use in a nuclear reactor environment and other applications requiring materials that can withstand high stresses, elevated temperatures or highly corrosive environment.

In one aspect, the disclosed technology can be implemented to provide a method of manufacturing a near net-shaped target structure. The method includes obtaining a model structure of an initial material composition having a predetermined geometry and dimensions; applying a slurry mixture into the model structure; and processing the model structure with the slurry mixture inside the model structure to convert the initial material composition of the model structure into a final material composition to obtain the target structure with the final material composition and having a geometry and dimensions that are substantially similar to the predetermined geometry and dimensions of the model structure.

In an embodiment, the step of processing the model structure with the slurry mixture inside the model structure comprises: generating a product of a first reaction between two or more components of the slurry mixture inside the model structure; and converting the model structure to the target structure through a second reaction based on the product of the first reaction.

In an embodiment, the model structure comprises a plurality of pores, and wherein the applying the slurry mixture into the model structure comprises applying the slurry mixture into the plurality of pores of the model structure. In some implementations where the pores are of uniform size and distributed uniformly through the model structure, the final target structure will be uniformly dense.

In an embodiment, the model structure comprises a model material, and the target structure comprises a target material. When the model material is different from the target material, the second reaction is between the product of the first reaction and the model structure. When the model material is compositionally the same as the target material, the second reaction is between the product of the first reaction and a third material generated from the slurry mixture inside the model structure. In the slurry mixture, one or more silicon (Si) particles coated with a silicon dioxide (SiO2) exterior layer is a half oxide silicon particle (HOSP) having a molar ratio to be around one, wherein the model material is carbon (C), and the target material is silicon carbide (SiC) when the model material is different from the target material, and wherein the model material and the target material are both SiCs and the third material is C when the model material is compositionally the same as the target material.

In an embodiment, the step of generating the product of the first reaction comprises generating a silicon monoxide (SiO) gas inside the model structure by increasing a temperature around the model structure with the slurry mixture inside the model structure to over 1200° C. under 10 mTorr to allow occurrence of the first reaction between SiO2 and Si of the slurry mixture inside the model structure, and wherein the first reaction is SiO2+Si=2SiO(g).

In an embodiment, the model structure is converted to the target structure through the second reaction between the SiO gas and C inside the model structure, wherein the second reaction is SiO(g)+2C=CO(g)+SiC.

In an embodiment, the method further includes preparing the Si particles coated with SiO2 by: providing a plurality of Si particles in a bed chamber; flowing oxygen ($O_2$) over the plurality of Si particles at a temperature between 900° C. and 1100° C. in the bed chamber to cause oxidation of the Si particles to form $SiO_2$; and stopping flowing $O_2$ when the molar ratio between Si and $SiO_2$ is around one.

In an embodiment, the step of applying the slurry mixture into the model structure comprises: providing the model structure in a container in a vacuum chamber; submerging the model structure in at least a portion of the slurry mixture by vacuuming air out of the vacuum chamber to 10-100 m Torr at 25° C. to suck the at least the portion of the slurry mixture from outside the vacuum chamber to the container in the vacuum chamber; applying the at least the portion of the slurry mixture into the plurality of pores of the model structure by applying a pressure in the vacuum chamber at 50-250 Psi and at 25° C.; releasing a pressure in the vacuum chamber after the at least the portion of the slurry mixture is inside the plurality of pores of the model structure; and drying the model structure with the at least the portion of the slurry mixture inside the plurality of pores of the model structure.

In an embodiment, the slurry mixture further comprises a fugitive binder that decomposes at 300° C. when the model material is different from the target material, and wherein the slurry mixture further comprises a carbon-producing resin that is converted to carbon at 900° C., and the initial density of the model material in the model structure is lower than the initial density of the target material in the target structure when the model material is compositionally the same as the target material.

In another aspect, the disclosed technology can be implemented to provide a method for fabricating a silicon carbide structure by using a pre-formed carbon foam structure in a desired geometry and dimensions. The method includes directing a slurry mixture of silicon particles coated with silicon dioxide exterior layers and a suspension material into the pre-formed carbon foam structure to cause the slurry mixture to penetrate into and fill in pores of the pre-formed carbon foam structure; placing the pre-formed carbon foam structure filled with the slurry mixture of the silicon particles coated with silicon dioxide exterior layers in a vacuum chamber; and supplying heat to the vacuum chamber to cause the silicon particles coated with silicon dioxide exterior layers filled in the pre-formed carbon foam structure to react to become a silicon monoxide gas which fills the pre-formed carbon foam structure and further reacts with carbon in the pre-formed carbon foam structure to convert the carbon in the pre-formed carbon foam structure into silicon carbide to form a silicon carbide structure from the pre-formed carbon foam structure while releasing a carbon monoxide gas, wherein the converted silicon carbide structure has a geometry and dimensions that are substantially similar to the pre-formed carbon foam structure.

In an embodiment, in the slurry mixture, one or more silicon particles coated with a silicon dioxide exterior layer is a HOSP having a molar ratio between the silicon and silicon dioxide to be around one.

In an embodiment, the suspension material in the slurry mixture includes a sacrificial binder that decomposes at an elevated temperature without leaving a residue. In an embodiment, the sacrificial binder includes a polymer material.

In an embodiment, the polymer material includes poly (propylene carbonate) that decomposes at around 300° C.

In an embodiment, the step of directing the slurry mixture into the pre-formed carbon foam structure is performed under a pressure which facilitates the slurry mixture to penetrate into and fill in pores of the pre-formed carbon foam structure.

In yet another aspect, the disclosed technology can be implemented to provide a method for forming densified silicon carbide structures. The method includes directing a slurry mixture of silicon particles coated with silicon dioxide exterior layers, and carbon producing resins into a silicon carbide foam structure to cause the slurry mixture to penetrate into and fill in pores of the silicon carbide foam structure; placing the silicon carbide foam structure filled with the slurry mixture of silicon particles coated with the silicon dioxide exterior layers, and the carbon-producing resins in a vacuum chamber; and supplying heat to the vacuum chamber to convert the carbon-producing resins to a residual-carbon structure, and cause the silicon particles coated with the silicon dioxide exterior layers filled in the silicon carbide foam structure to react to become a silicon monoxide gas which fills the silicon carbide foam structure to further react with the residual-carbon structure and convert the residual-carbon structure into a silicon carbide structure that fills at least a portion of the pores of the silicon carbide foam structure while releasing a carbon monoxide gas.

In an embodiment, the converted silicon carbide structure has a geometry and dimensions that are substantially similar to the residual-carbon structure generated from the carbon producing resins.

In an embodiment, in the slurry mixture, one or more silicon particles coated with a silicon dioxide exterior layer is a HOSP having a molar ratio between the silicon and silicon dioxide to be around one.

In an embodiment, the residual-carbon structure is generated from the carbon-producing resins at a heat-treatment temperature, and the silicon monoxide gas is generated by reaction between the silicon and silicon dioxide at a first temperature, the resin heat-treatment temperature being lower than the first and second temperatures.

In an embodiment, the step of directing the slurry mixture into the silicon carbide foam structure is performed under a pressure which facilitates the slurry mixture to penetrate into and fill in the pores of the silicon carbide foam structure.

The above and other aspects and their implementations are described in greater detail in the drawings, the description and the claims.

DETAILED DESCRIPTION

Figure 1:
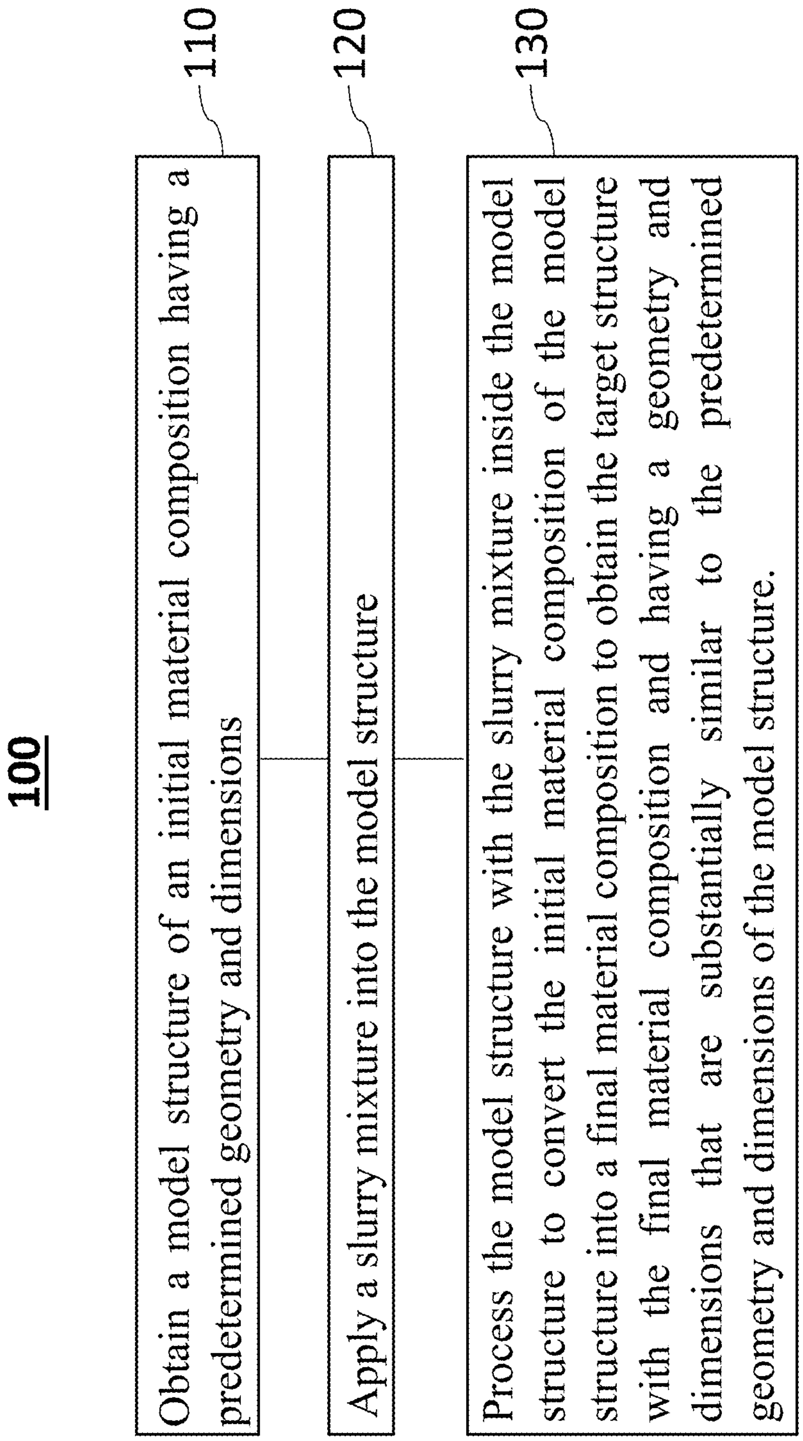
FIG. 1 is a flowchart for an example method of manufacturing a target structure using a model structure.

Silicon carbide materials are well-suited to withstand extreme conditions at high temperatures and under great stress. In most applications, silicon carbide needs to be machined to certain geometry to fit into system. Silicon carbon is one of the hardest materials, machining is very difficult, time consuming and expensive. The technology disclosed in this patent document provides a fabrication process by using a preform material or structure that can be machined or shaped to a desired final geometry with desired dimensions to create the final silicon carbon or other high strength material in the preform geometry and dimensions to reduce the difficulty in machining such high strength materials and to reduce the cost and to improve the production efficiency.

High strength materials made from the disclosed technology can be in various forms, geometries and dimensions, e.g., in form of foam or solid, and can be used for various applications require high strength, high temperature performance, and corrosion resistance, including non-nuclear reactor applications such as heat exchangers, nozzles, nosecones, high temperature filter, chemical process conduct, or related components, and components, parts and modules for nuclear reactor applications.

Silicon carbide-based materials have been utilized in concept and design studies of blankets and fusion channel inserts for fusion devices. The FCI within a dual-coolant lead lithium (DCLL) blanket concept is a particularly appealing candidate for this fusion application. The low activation properties of silicon carbide, combined with its high temperature strength, make it a potentially superior material solution for many fusion applications. In some applications it is desirable for silicon carbide structures to be designed with high heat thermal conductivity while in other applications it is desirable for the structures to have low thermal conductivity. For example, for FCI, molten lead lithium (PbLi) flows inside FCI at a temperature of 700 C and the FCI outer surface needs to stay at a temperature of 300 C, so that FCI wall should be a good insulator. For example, thermal conductivity can be controlled by tailoring the silicon carbide microstructure through the presence of pores and voids. Based on that, silicon carbide foam (containing many pores to lower conductivity) can be a good candidate for FCI.

The nuclear fuel material used in a nuclear fission or fusion reactors are capable of enduring high operating temperatures and an intense neutron radiation environment. Fuel structures need to maintain their shape and integrity over a long time period within the reactor, thereby preventing the leakage of coolants or fission products.

Silicon carbide can be used in both fission and fusion applications, and recently has been considered as a candidate nuclear fuel material for fuel rods and for accident tolerant fuel cladding in light water reactors. It is also under consideration for fusion first wall or fusion FCI within a DCLL blanket. Silicon carbide is a stable material under neutron irradiation, undergoing only minimal swelling and strength changes to 40 dpa and higher, which represents many times the exposure for a typical light water reactor (LWR) fuel life. In addition, silicon carbide retains its mechanical properties at high temperature and reacts slowly with steam compared to Zircaloy, thus affording improved safety for water cooled reactors in a loss-of-coolant (LOCA) and other potential accident conditions.

The above desired material properties of silicon carbide also make it technically challenging or difficult to manufacture either solid or porous silicon carbide based materials or structures with desirable geometry and dimensions using various existing machining processes. The technology disclosed in this patent document is in part based on the recognition that silicon carbide and other high strength materials may be difficult to machine to achieve desired geometries and dimensions due to their high material strengths. The disclosed technology provides designs of silicon carbide and other high strength materials by using a preform material or structure that can be machined or shaped to a desired final geometry with desired dimensions and by processing the preform material or structure via one or more chemical reactions to generate the final desired material composition with a higher material strength that substantially maintains the geometry and dimensions of the preform material or structure, thus getting around or largely avoiding the technically difficult task of machining the final desired material composition with a higher material strength. The disclosed technology for using a preform material or structure to achieve a desired final material or structure with a higher material strength can be used to fabricate high strength materials or structures in various applications, including but not limited to FCI for fusion reactors, fuel rods for LWR systems and high strength components or parts in various other applications.

In some implementations of the disclosed technology, a method for fabricating a silicon carbide structure is provided by using a pre-formed carbon foam structure in a desired geometry and dimensions. The method includes directing a slurry mixture of silicon particles coated with silicon dioxide exterior layers and a suspension material into the pre-formed carbon foam structure to cause the slurry mixture to penetrate into and fill in pores of the pre-formed carbon foam structure. The method further includes placing the pre-formed carbon foam structure filled with the slurry mixture of the silicon particles coated with silicon dioxide exterior layers in a vacuum chamber, and supplying heat to the vacuum chamber to cause the silicon particles coated with silicon dioxide exterior layers filled in the pre-formed carbon foam structure to react to become a silicon monoxide gas which fills the pre-formed carbon foam structure and further reacts with carbon in the pre-formed carbon foam structure to convert the carbon in the pre-formed carbon foam structure into silicon carbide to form a silicon carbide structure from the pre-formed carbon foam structure while releasing a carbon monoxide gas. The converted silicon carbide structure has a geometry and dimensions that are substantially similar to the pre-formed carbon foam structure.

Described herein also includes a method for forming a densified silicon carbide structure. The method includes directing a slurry mixture of silicon particles coated with silicon dioxide exterior layers, and carbon-producing resins into a silicon carbide foam structure to cause the slurry mixture to penetrate into and fill in pores of the silicon carbide foam structure. The method further includes placing the silicon carbide foam structure filled with the slurry mixture of silicon particles coated with the silicon dioxide exterior layers, and the carbon-producing resins in a vacuum chamber, and supplying heat to the vacuum chamber to convert the carbon-producing resins to a residual-carbon structure, and cause the silicon particles coated with the silicon dioxide exterior layers filled in the silicon carbide foam structure to react to become a silicon monoxide gas which fills the silicon carbide foam structure to further react with the residual-carbon material and convert the residual-carbon structure into a silicon carbide structure that fills at least a portion of the pores of the silicon carbide foam structure while releasing a carbon monoxide gas. The converted silicon carbide structure has a geometry and dimensions that are substantially similar to the carbon structure converted from the carbon producing resins.

FIG. 1 is a flowchart for an example method 100 of manufacturing a target structure (e.g., silicon carbide with a high material strength) using a model structure (e.g., a carbon foam material that may be machined with a relative case in comparison to the silicon carbide). With the proper selection of the materials and the processing of the target material, the target structure and the model structure may have substantially similar geometries and dimensions. Such a process from converting the initial model structure into the final target structure may be referred to as a near net shape fabrication process. In some embodiments, the volume difference between the target structure and the model structure is within five percent of the volume of the model structure. In some embodiments, the volume difference between the target structure and the model structure is within one percent of the volume of the model structure. However, the target structure and the model structure have different material compositions, meaning either the target structure and the model structure are made of different materials, or they have different densities because they include different amounts of the same material but have substantially similar geometries and dimensions.

At step 110, the model structure of an initial material composition having a predetermined geometry and dimensions is obtained. In an embodiment, the predetermined geometry and dimensions are the desired geometry and dimensions for the target model. When the method 100 is implemented to convert the model structure to the target structure that is made of a different material than the model structure, the initial material composition at step 110 may be referred to as an initial material that the model structure is made of. In an embodiment, the model structure is provided using a standard machining technology. In an embodiment, the model structure may be obtained by purchasing from a retailer or from a manufacturing factory directly. In an embodiment, the model structure and the target structure are porous structures made of different materials. A porous structure may also be referred to as a foam structure. For example, the model structure may be a carbon foam structure, and the target structure may be a silicon carbide foam structure. When the method 100 is implemented to densify the model structure to form a densified target structure, the initial material composition may be referred to as an initial amount of the same material included in the model structure. In an embodiment, the model structure is provided using a similar process as method 100. In an embodiment, the model structure and the target structure are both porous structures made of the same material, but the target structure has a higher density than the model structure. In an embodiment, the model structure is a porous structure, and the target structure is a solid structure made of the same material as the model structure. For example, the model structure may be a silicon carbide foam structure, and the target structure may be a solid silicon carbide structure. In another example, the model structure may be a low-density silicon carbide foam structure, and the target structure may be a higher density silicon carbide foam structure with reduced porosity.

At step 120, a slurry mixture is applied into the model structure. In an embodiment, the slurry mixture may be applied into the pores of the model structure. In an embodiment, the slurry mixture may be applied to fill the pores of the model structure. The slurry mixture may include two or more components that enable or facilitate conversion of the model structure composition to the target structure composition. In some embodiments, the slurry mixture may include additives, a binder and a solvent. The additives used can be powders, whiskers, fibers, granules or any combination thereof. The binder portion of the slurry mixture may include a polymer. In some embodiments, the polymer is a sacrificial polymer that decomposes at an elevated temperature. The binder may be a solid at the room temperature and soluble in a cleanly evaporating solvent, such as acetone, methyl ethyl ketone, and ethanol. In some embodiments, the slurry mixture may include a resin, for example, a carbon-producing resin that can be converted to carbon material at an elevated temperature with a flowing argon, nitrogen, or other inert gas around the carbon producing resin. The viscosity of slurry mixtures can vary greatly based on the additive to biner ratio as well as the additive and binder to solvent ratio. The slurry viscosity should be tailored to the application method being used with the added consideration that multiple applications are possible.

At step 130, the model structure with the slurry mixture inside the model structure is processed to convert the initial material composition of the model structure into a final material composition to obtain the target structure with the final material composition. The model structure and the target structure have substantially similar geometries and dimensions. When the method 100 is implemented to convert the model structure to the target structure that is made of a different material, the final material composition at step 130 may be referred to as a final material that the initial material of the model structure is converted to and the target structure is made of. When the method 100 is implemented to densify the model structure to form a densified target structure, the final material composition at step 130 may be referred to as the greater amount of the same material included in the model structure than the target structure.

Figure 2A:
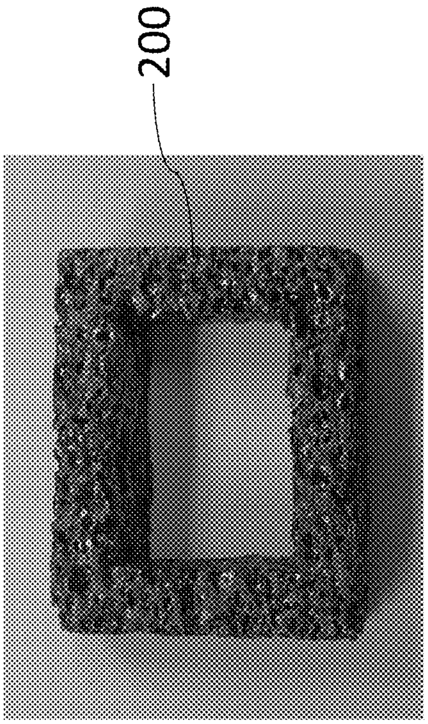
FIG. 2A shows an example of a model carbon foam structure.

For example, method 100 may be implemented to convert a preformed carbon foam structure to a silicon carbide foam structure. In this example, the model structure is the preformed carbon foam structure, and the target structure is the silicon carbide foam structure. In addition, the initial material composition is carbon, and the final material composition is silicon carbide. Method 100 is implemented to convert the carbon in the carbon foam structure to silicon carbide to obtain the silicon carbide foam structure having a geometry and dimensions that are substantially similar to the preformed carbon foam structure. In an embodiment, the volume change between the carbon foam structure and the silicon carbide foam structure is within a five percent of the volume of the carbon foam structure. In an embodiment, the volume change between the carbon foam structure and the silicon carbide foam structure is within one percent of the volume of the carbon foam structure. At step 110, the carbon foam structure having a predetermined geometry and dimensions is obtained. An example of the carbon foam structure 200 is shown in FIG. 2A. The carbon foam structure may be obtained from a manufacturing factory or from a retailer. The carbon foam structure may be manufactured by using a standard machining technology.

At step 120, a slurry mixture is applied into the carbon foam structure. In an embodiment, the slurry mixture is applied into the pores of the carbon foam structure. In an embodiment, the slurry mixture fills the pores of the carbon foam structure. The slurry mixture is a mixture of silicon, silicon dioxide, and a suspension material. In an embodiment, silicon and silicon dioxide are provided as silicon particles coated with silicon dioxide exterior layers.

In an embodiment, one or more silicon particles coated with a silicon dioxide exterior layer is a half oxide silicon particle (HOSP) having a molar ratio between silicon and silicon dioxide to be around one. In other words, each HOSP including one or more silicon particles coated with a silicon dioxide exterior layer has the same or a substantially similar amount of silicon and silicon dioxide. An example method of manufacturing the HOSPs will be described in greater details in FIGS. 3A, 3B, 3C, and 4. In an embodiment, the suspension material in the slurry mixture is a sacrificial binder that decomposes at an elevated temperature without leaving a residue. In an embodiment, the sacrificial binder is a polymer material, for example, poly (propylene carbonate) having a chemical formula of ($C_4H_6O_3$), that decomposes at around 300° C. In an embodiment, the polymer material may be a QPAC®40 product. The slurry mixture may be applied into the carbon foam structure in any suitable ways. An embodiment of implementing step 120 will be described in great details below associated with FIGS. 5 and 6.

Figure 2B:
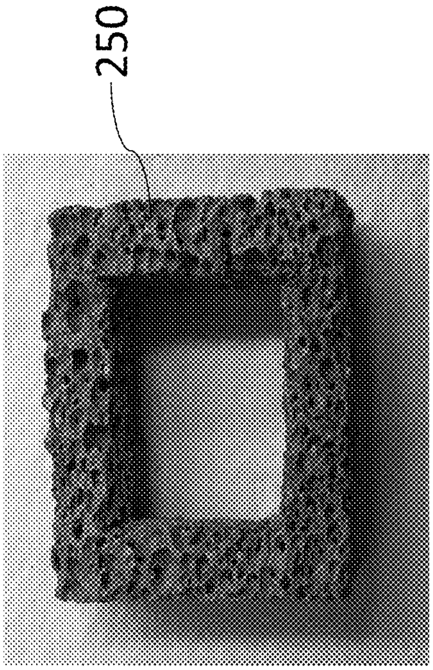
FIG. 2B shows an example of a final target silicon carbide foam structure converted from a carbon structure.

At step 130, the carbon foam structure with the slurry mixture of silicon, silicon dioxide, and the suspension material inside the pores of the carbon foam structure is processed to convert carbon to silicon carbide to obtain the silicon carbide foam structure. For example, the carbon foam structure filled with the slurry mixture is heated at over 1200° C. in vacuum (<10 mTorr) to cause silicon to react with silicon dioxide to generate silicon monoxide gas that fills the pre-formed carbon foam structure and further reacts with the carbon foam structure converting carbon to silicon carbide while releasing a carbon monoxide gas. In an embodiment, the carbon foam structure with the slurry mixture inside the carbon foam structure may be heated at 1400° C. for two hours. An embodiment of implementing step 130 for this example will be discussed in greater details below associated with FIGS. 7, 8, 9A, 9B, and 10. An example of the silicon carbide foam structure 250 is shown in FIG. 2B. As shown, the silicon carbide foam structure 250 has a geometry and dimensions that are substantially similar to the carbon foam structure 200. In the example of FIGS. 2A and 2B, the volume difference between the carbon foam structure 200 and the silicon carbide foam structure 250 is within 1% of a volume of the carbon foam structure 200.

As another example, method 100 may be implemented to densify a silicon carbide foam structure to form a densified silicon carbide structure. In this example, the model structure is the silicon carbide foam structure, and the target structure is the densified silicon carbide structure. Although both the model structure and the target structure are made of silicon carbide, the target structure has a greater amount of silicon carbide than the model structure resulting in a higher density than the model structure. In an embodiment, the target structure may be a silicon carbide foam structure having a higher density than the model structure. In an embodiment, the target structure is a solid silicon carbide structure. Method 100 is implemented to reduce the pore sizes of the silicon carbide foam structure by forming silicon carbide inside the pores and obtain the densified silicon carbide structure.

At step 110, a silicon carbide foam structure having a predetermined geometry and dimensions is obtained. An example of the silicon carbide foam structure is shown in FIG. 2B. The silicon carbide foam structure may be obtained from a manufacturing factory or from a retailer. In an embodiment, the silicon carbide foam structure may be converted from a carbon foam structure using method 100 as described above.

At step 120, a slurry mixture is applied into the silicon carbide foam structure. In an embodiment, the slurry mixture is applied into the pores of the silicon carbide foam structure. In an embodiment, the slurry mixture fills the pores of the silicon carbide foam structure. In an embodiment, the slurry mixture is a mixture of silicon, silicon dioxide, and a carbon producing resin. In an embodiment, silicon and silicon dioxide are provided as silicon particles coated with silicon dioxide exterior layers. In an embodiment, one or more silicon particles coated with a silicon dioxide exterior layer is a HOSP having a molar ratio between silicon and silicon dioxide to be around one. In other word, each HOSP includes a same or a substantially similar molar amount of silicon and silicon dioxide. An example method of manufacturing the HOSPs will be described in greater details below associated with FIGS. 3A, 3B, 3C, and 4. The carbon producing resin may be converted to carbon at an elevated temperature, for example, at about 900° C. or between 900° C. and 1200° C. with a flowing argon, nitrogen, or other inert gas around the carbon producing resin. The slurry mixture may be applied into the carbon foam structure in any suitable ways. An embodiment of implementing step 120 will be described in great details below associated with FIGS. 5 and 6.

At step 130, the silicon carbide foam structure with the slurry mixture of silicon, silicon dioxide, and the carbon-producing resin inside the pores of the silicon carbide foam structure is processed to increase the amount of silicon carbide in the silicon carbide foam structure by producing silicon carbide inside the pores to obtain the densified silicon carbide structure with an increased density. For example, the silicon carbide foam structure with the slurry mixture inside the silicon carbide foam structure is first heated at about 900° C. or between 900° C. and 1200° C. with a flowing argon, nitrogen, or other inert gas inside a furnace causing the carbon-producing resin in the slurry mixture to form residual-carbon structures inside the pores of the silicon carbide foam structure. Further increasing the temperature to at least 1200° C. in vacuum (<10 m Torr) inside the furnace will cause the silicon particles from the slurry mixture to react with silicon dioxide to generate silicon monoxide gas that permeates the silicon carbide foam structure and further reacts with the residual-carbon structures generated from the resin to convert carbon to silicon carbide while releasing a carbon monoxide gas. The densified silicon carbide structure with the reduced pore sizes and an increased amount of silicon carbide has a geometry and dimensions that are substantially similar to the silicon carbide foam structure, but a higher density than the silicon carbide foam structure. The higher density can increase the strength and thermal conductivity of the silicon carbide foam structure. An embodiment of implementing step 130 for this example will be discussed in greater details associated with FIGS. 11, 12A, 12B, 12C and 13.

Figure 2C:
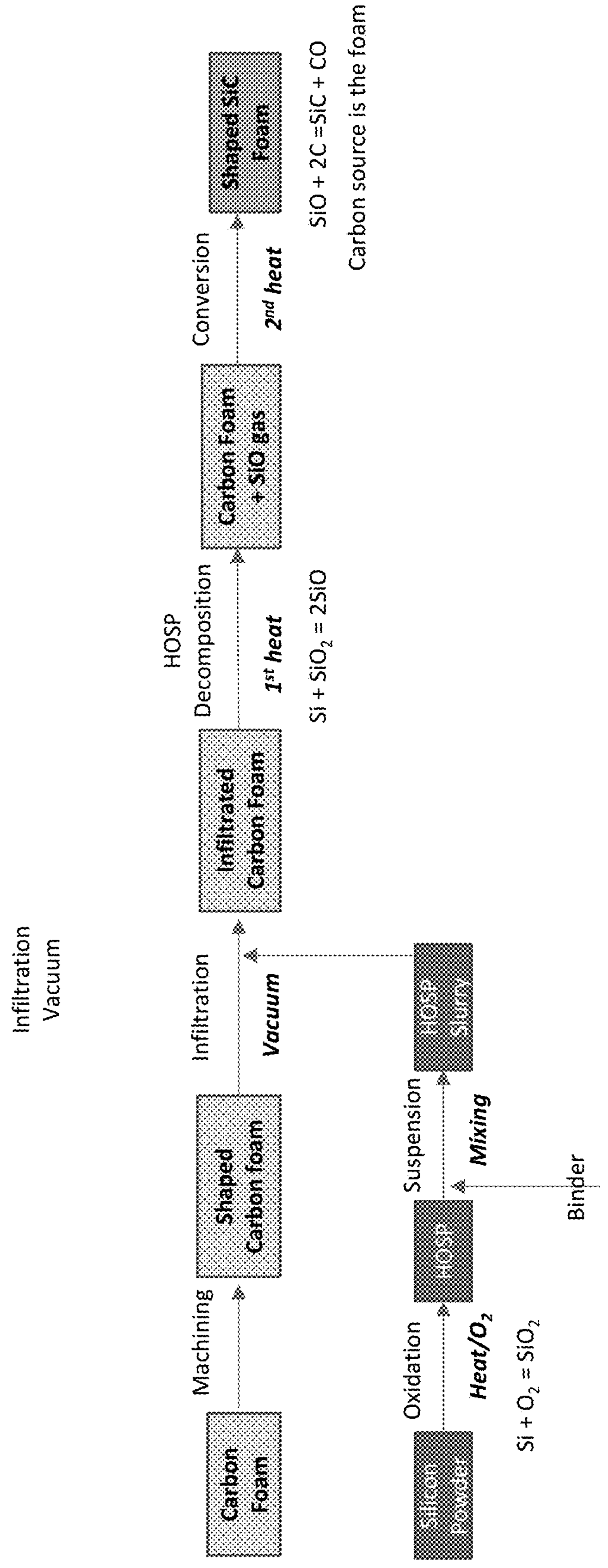
FIG. 2C shows the different fabrication steps and equipment processes for using a carbon foam as a starting material to produce the model structure in FIG. 1 and convert the carbon foam model structure in FIG. 2A into the final target silicon carbide foam structure in FIG. 2B.

FIG. 2C shows different fabrication processes and equipment for using a carbon foam as a starting material to produce the model structure in FIG. 1 and convert the carbon foam model structure in FIG. 2A into the final target silicon carbide foam structure in FIG. 2B. The details of various fabrication steps are described below, including decomposing of polymer, reaction of silicon and silicon dioxide into a silicon monoxide gas and using a chemical reaction to replace the silicon with the carbon and converting silicon monoxide into silicon carbide and carbon monoxide to achieve the near net shape conversion of the carbon foam model structure into the silicon carbide foam.

Figure 2D:
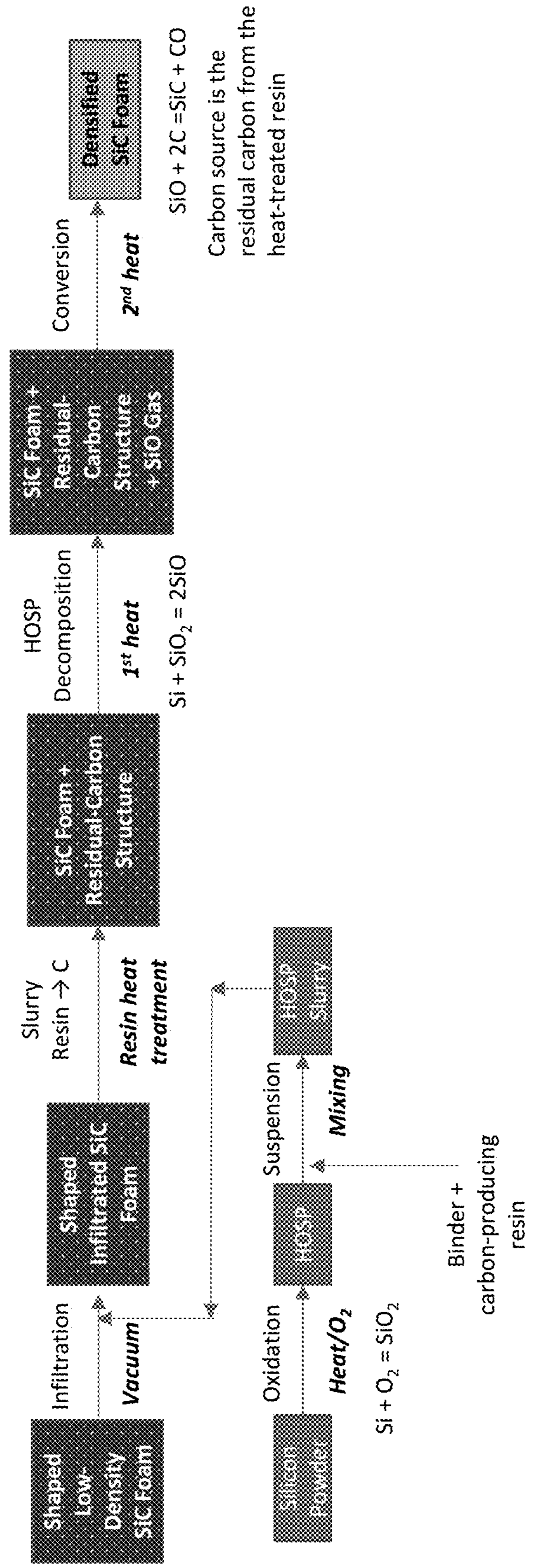
FIG. 2D shows the different fabrication steps and equipment processes for using a shaped silicon carbide foam as a starting material to produce the model structure in FIG. 1 and convert the silicon carbide foam model structure into a densified final target silicon carbide structure.

FIG. 2D shows different fabrication processes and equipment for using a silicon carbide foam as a starting material to produce the model structure in FIG. 1 and convert the silicon carbide foam model structure into a densified final target silicon carbide structure. The details of various fabrication steps are described below, including producing residual carbon by heat treating a carbon-producing resin, decomposing silicon and silicon dioxide into a silicon monoxide gas, and using a chemical reaction to replace the silicon with the carbon and converting silicon monoxide into silicon carbide and carbon monoxide to achieve the near net shape conversion of the silicon carbide foam model structure into the densified final silicon carbide target structure.

Figure 3A:
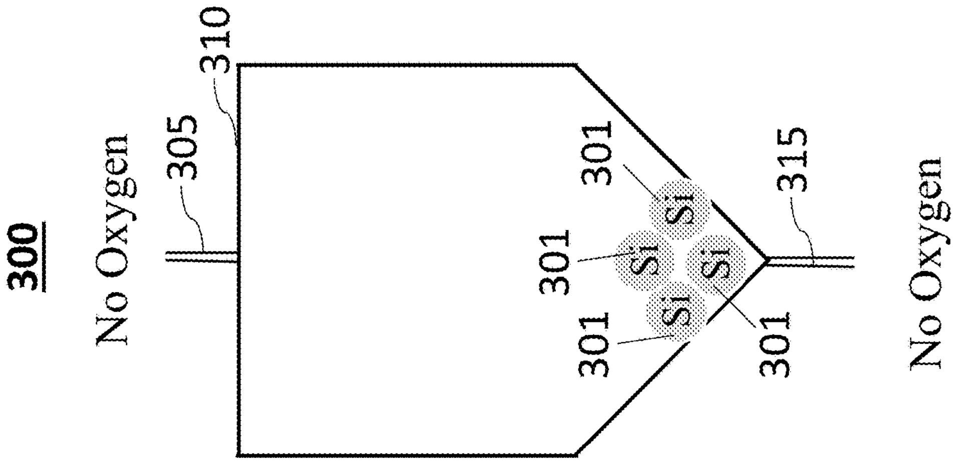
FIGS. 3A, 3B, and 3C depict an illustration showing an example process of manufacturing half oxide silicon particles each including one or more silicon particles coated with a silicon dioxide exterior layer using a fluidized bed furnace.
Figure 3B:
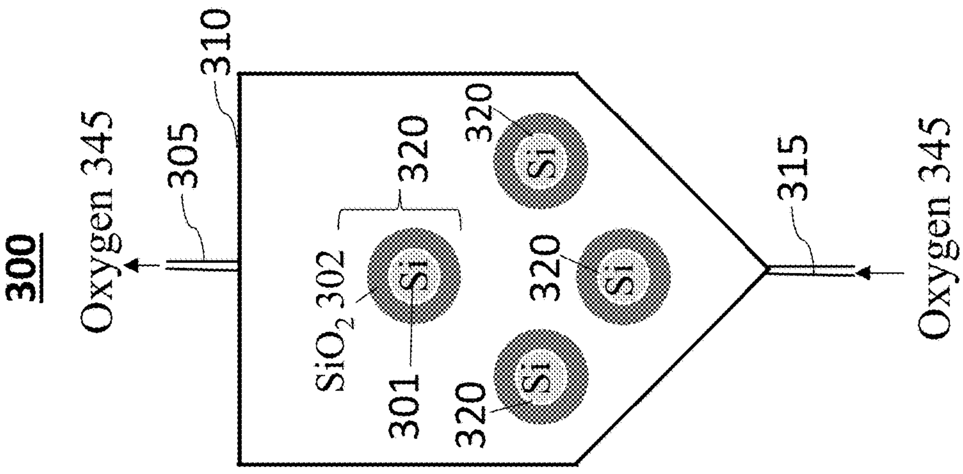
Figure 3C:
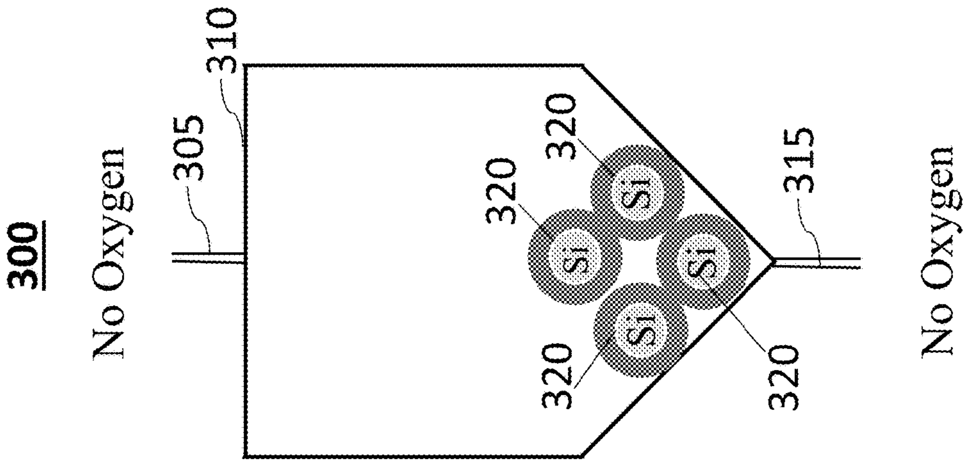

FIGS. 3A, 3B, and 3C depict an illustration showing an example process of manufacturing HOSPs each including one or more silicon particles coated with a silicon dioxide exterior layer using a fluidized bed furnace 300. As shown, the fluidized bed furnace 300 includes a bed chamber 310, an inflowing port 315 and an outflowing port 305. The bed chamber 310 may have any suitable shape. In this example, the bed chamber 310 has a cylindrical shape in the top and a cone shape in the bottom. The inflowing port 315 allows a gas, for example, an oxygen gas, to flow into the bed chamber 310. The outflowing port 305 allows the gas, for example, the oxygen gas, to flow out of the bed chamber 310. Before operating the fluidized bed furnace 300 to manufacture the HOSPs, the silicon particles 301 are placed into the fluidized bed furnace 300. Due to the gravity, the silicon particles 301 stay at the bottom of the bed chamber 310 as shown in FIG. 3A. The size of the silicon particles can range, in some applications, between 50 nm and 50 microns and may approximately 5 microns in certain applications.

During the manufacturing process as shown in FIG. 3B, the fluidized bed furnace 300 supplies heat to elevate the temperature inside the bed chamber 310 between 900° C. and 1100° C. In the meanwhile, an oxygen gas 345 flows into the bed chamber 310 through the inflowing port 315 and exits through the outflowing port 305. The oxygen gas 345 keeps the silicon particles 301 suspended in the bed chamber 310, allowing a uniform oxidization of the silicon particles 301 to form silicon dioxide 302 on the surface of the silicon particles 301. The oxygen gas 345 is stopped from flowing into the bed chamber 310 and the fluidized bed furnace 300 stops heating the bed chamber 310 when the molar ratio between silicon and silicon dioxide is around one. The unit molar ratio between silicon and silicon dioxide means an amount of silicon is equal to an amount of silicon dioxide by molar quantity, or a 50% oxidation of the molar amount of silicon particles 301, which can be achieved by a careful control of operating time, temperature, and oxygen flow control.

In the examples of HOSPs 320 as shown in FIG. 3B, each HOSP 320 includes a single silicon particle 301 which is partially oxidized and coated with a silicon dioxide exterior layer 302 to form a HOSP 320 having a molar ratio between silicon and silicon dioxide to be around one. In some other embodiments, each HOSP 320 may include two or more silicon particles 301 coated with a silicon dioxide exterior layer 302, having a molar ratio between silicon and silicon dioxide to be around one. In various implementations, it may be preferable that each HOSP 320 individually have a molar ratio between silicon and silicon dioxide of around one. As explained in this description, the HOSPs can be distributed within a model structure (see FIG. 6). During this process, it may be difficult to ensure that any two or more specific silicon particles would stay adjacent to each other when distributed. In a situation where two or more silicon particles collectively have a molar ratio between silicon and silicon dioxide of around one, but do not have this molar ratio around one at individual silicon particles coated with silicon dioxide, then once such silicon dioxide coated silicon particles are distributed and separated in the model structure, certain areas may have particles that are more silicon-rich, and other regions may have particles that had a higher ratio of silicon dioxide. After subsequent processing, this may lead to regions with a tendency to have a less uniform stoichiometry compared to a similar process where each individual HOSP had a molar ratio between silicon and silicon dioxide to be around one.

FIG. 3C shows the HOSPs 320 are manufactured and placed in the bed chamber 310. Because no oxygen gas flows into the bed chamber 310, the HOSPs 320 stay at the bottom of the bed chamber 310 because of gravity.

Figure 4:
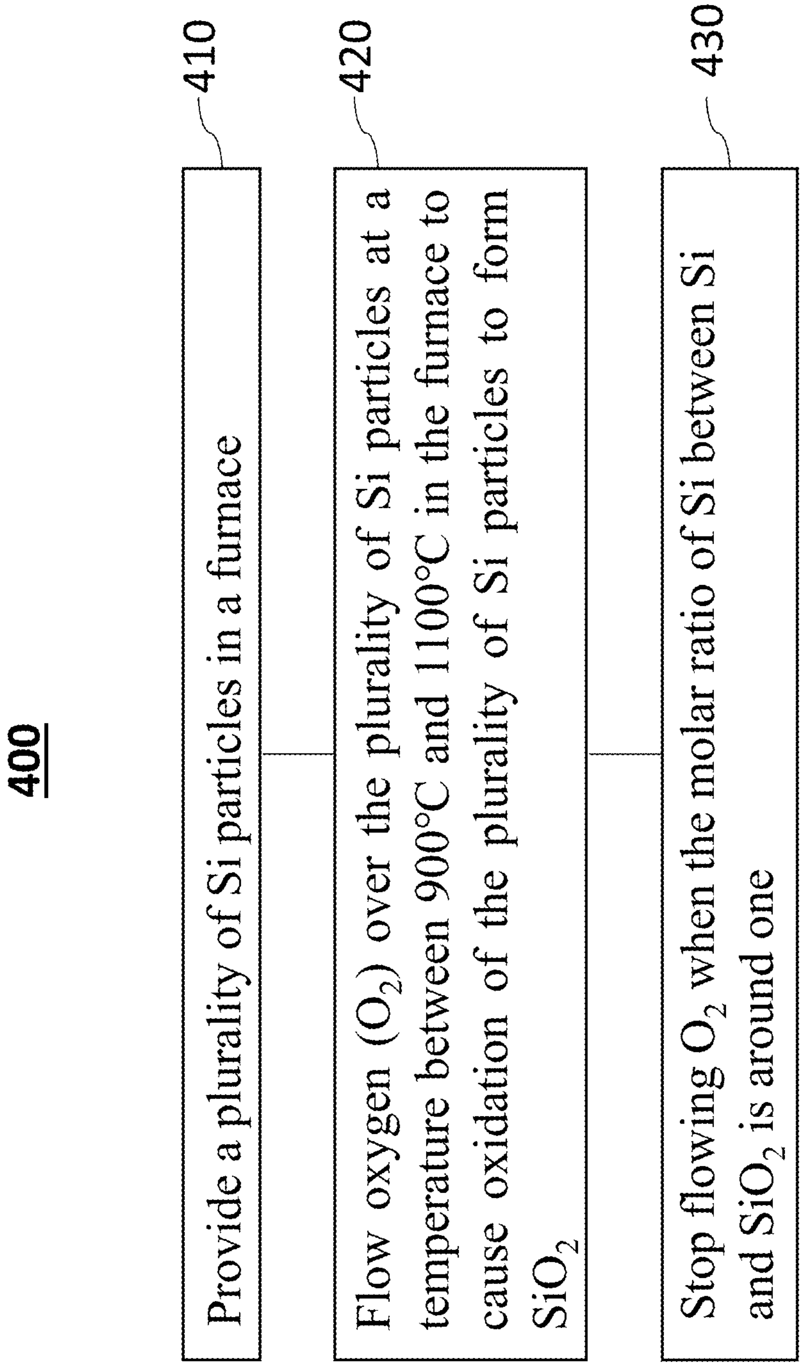
FIG. 4 is a flowchart for an example method of manufacturing half oxide silicon particles.

FIG. 4 is a flowchart for an example method 400 of manufacturing half oxide silicon particles 320. In an embodiment, method 400 may be implemented using the fluidized bed furnace 300. In some embodiments, method 400 may be implemented using any other suitable furnace. At step 410, a plurality of silicon particles is provided in a furnace. In an embodiment, the plurality of silicon particles is the silicon particles 301 provided in the fluidized bed furnace 310 as shown in FIG. 3A. At step 420, an oxygen gas is flowed over the plurality of silicon particles at a temperature between 900° C. and 1100° C. in the furnace to cause oxidation of the plurality of silicon particles to form silicon dioxide. As shown in FIG. 3B, the oxygen gas 345 is flown over the plurality of silicon particles 301 in the bed chamber 310 of the fluidized bed furnace 300 to cause oxidation of the silicon particles 301 to form silicon dioxide exterior layers 302 enclosing the silicon particles 301. At step 430, the oxygen gas is stopped flowing when the molar ratio between silicon and silicon dioxide is around one. As shown in FIG. 3C, the oxygen gas 345 is stopped flowing into the bed chamber 310 when the molar ratio between silicon and silicon dioxide is around one. The HOSPs 320 each including one or more silicon particles 301 coated with a silicon dioxide exterior layer 302 are provided.

Figure 5:
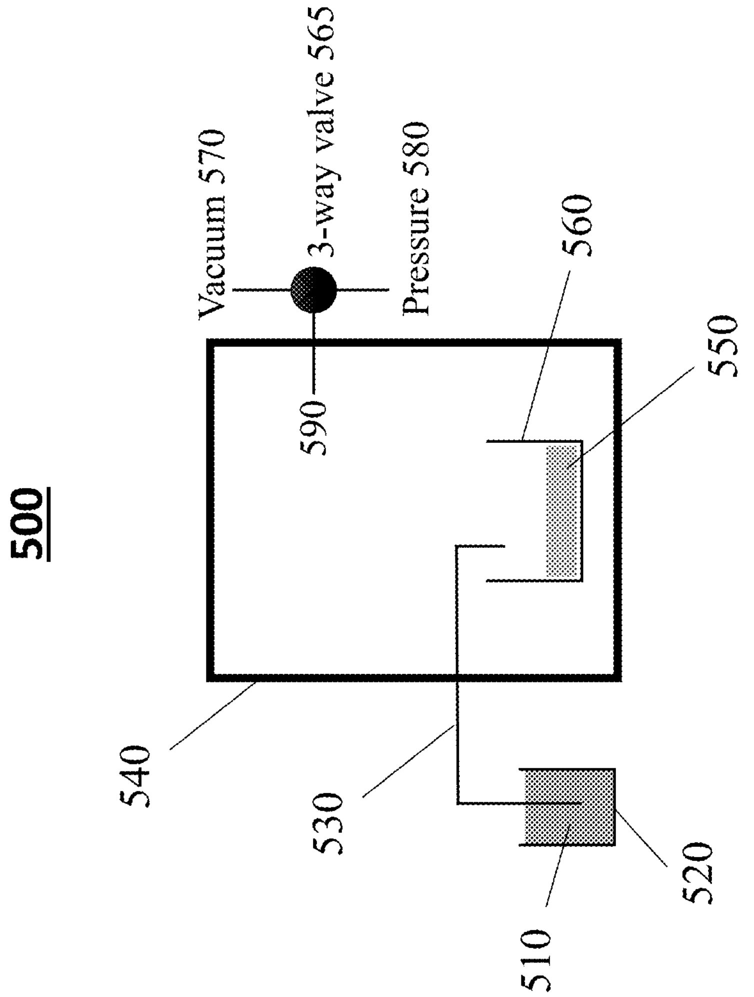
FIG. 5 shows an example of a vacuum infiltrator configured to apply a slurry mixture into a model structure.

FIG. 5 shows an example of an infiltrator 500 configured to apply a slurry mixture 510 into a model structure 550. In some embodiments, the infiltrator 500 may be operated at the room temperature, for example, at 25° C. In some embodiments, the model structure 550 is a foam structure. For example, the model structure may be a carbon foam structure or a silicon carbide foam structure. In an embodiment, the infiltrator 500 may be used to implement step 120 of method 100 in FIG. 1. As shown, the infiltrator 500 includes a chamber 540, capable of holding vacuum or pressure, and a first container 560 for holding the model structure 550. The infiltrator 500 further includes a sucking pipe 530 for transport the slurry mixture 510 from outside the chamber 540 to the first container 560 and submerge at least a portion of the model structure 550 in the first container 560 when the chamber is in vacuum (i.e., at 10-100 mTorr). As shown in FIG. 5, the slurry mixture 510 is placed in a second container 520 outside the chamber 540. In an embodiment, the slurry mixture 510 is a mixture of silicon particles coated with silicon dioxide exterior layers and a suspension material. In an embodiment, the suspension material in the slurry mixture includes a sacrificial binder that decomposes at an elevated temperature without leaving a residual. In an embodiment, the sacrificial binder includes a polymer material, including poly (propylene carbonate) that decomposes at around 300° C. In an embodiment, the slurry mixture 510 is mixture of silicon particles coated with silicon dioxide exterior layers and carbon-producing resins. The chamber 500 further includes a 3-way valve 565 configured to control the operating conditions inside the chamber 540. The 3-way valve 365 includes a vacuum port 570, a pressure port 580 and a connecting port 590 passing through the chamber 540. The 3-way valve 365 may include a lever or an actuator to connect the pathways between the connecting port 590 and one of the vacuum port 570 and the pressure port 580 for alternating appropriate functions. For example, the 3-way valve 365 may allow for vacuuming the air in the vacuum chamber 540 out of the chamber 540 and for maintaining 10-100 mTorr inside the chamber 540 by connecting the pathways between the vacuum port 570 and the connecting port 590 inside the 3-way valve 365. This is done so that the slurry mixture 510 may be transported to the first container 560 and submerge at least a portion of the model structure 550 through the sucking pipe 530 when the chamber 540 is in vacuum. The 3-way valve 365 may allow for applying a pressure in the chamber 540 at 50-250 Psi and releasing the pressure by connecting the pathways between the pressure port 580 and the connecting port 590 inside the 3-way valve 565. The applied pressure may cause the slurry mixture 510 sucked into the first container 560 under vacuum to be directed into the pores of the model structure 550.

Figure 6:
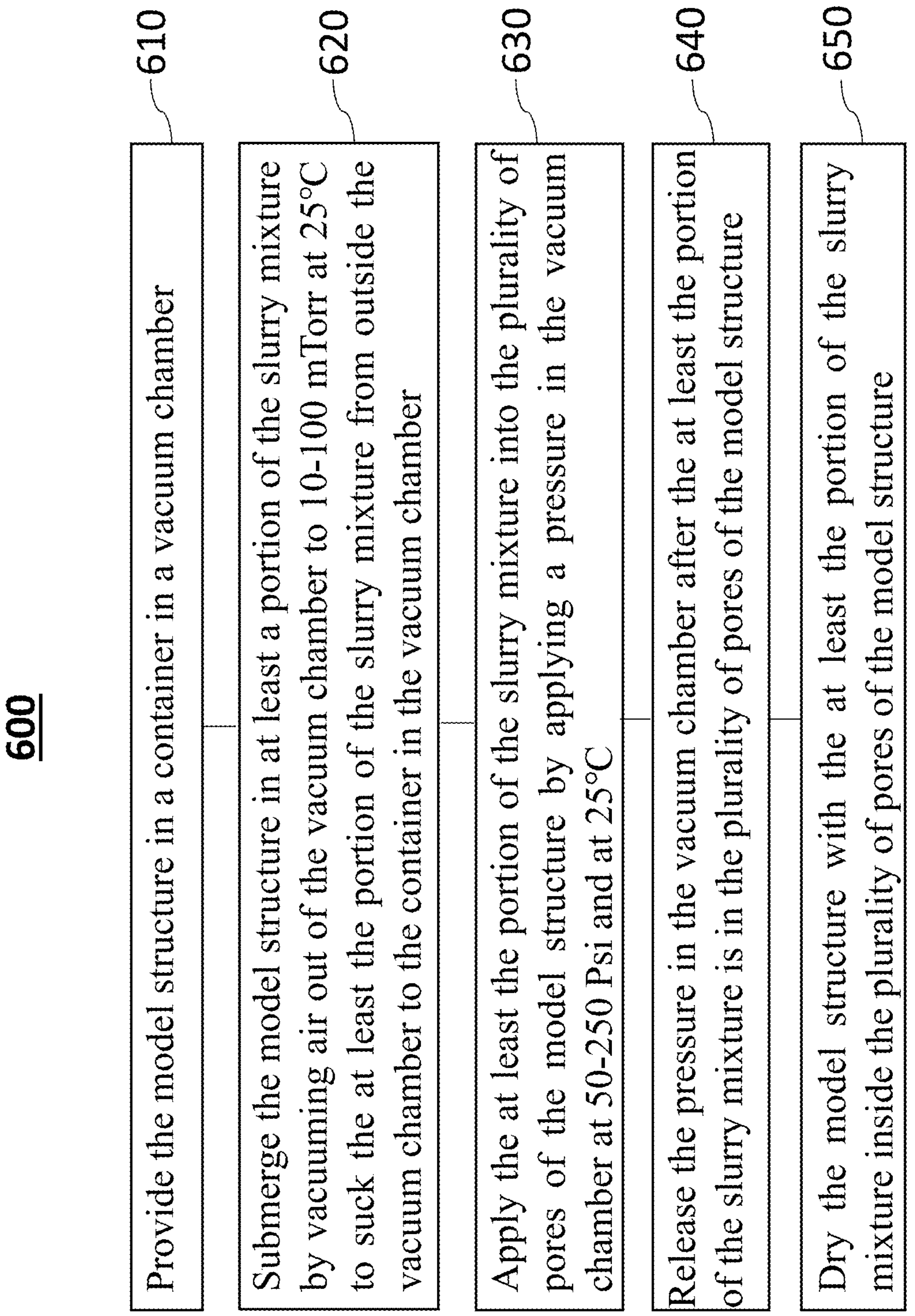
FIG. 6 is a flowchart for an example method of applying a slurry mixture into a model structure.

FIG. 6 is a flowchart for an example method 600 of applying a slurry mixture into a model structure. In an embodiment, method 600 may be used to implement step 120 of method 100 in FIG. 1. In an embodiment, method 600 may be implemented using the infiltrator 500 as shown in FIG. 5. At step 610, the model structure is provided in a container in a vacuum chamber. For example, the model structure 550 is provided in the first container 560 in the chamber 540 of the infiltrator 500. At step 620, the model structure is submerged in at least a portion of slurry mixture by vacuuming air out of the chamber to 10-100 mTorr at 25° C. to suck at least a portion of the slurry mixture from outside the vacuum chamber to the container inside the vacuum chamber. For example, the 3-way valve 565 may be configured to allow for vacuuming air out of the chamber 540 to 10-100 mTorr at 25° C., when at least a portion of the slurry mixture 510 is sucked from outside the vacuum chamber 540 to submerge the model structure 550 in the first container 560 inside the chamber 540 as shown in FIG. 5.

Figure 8:
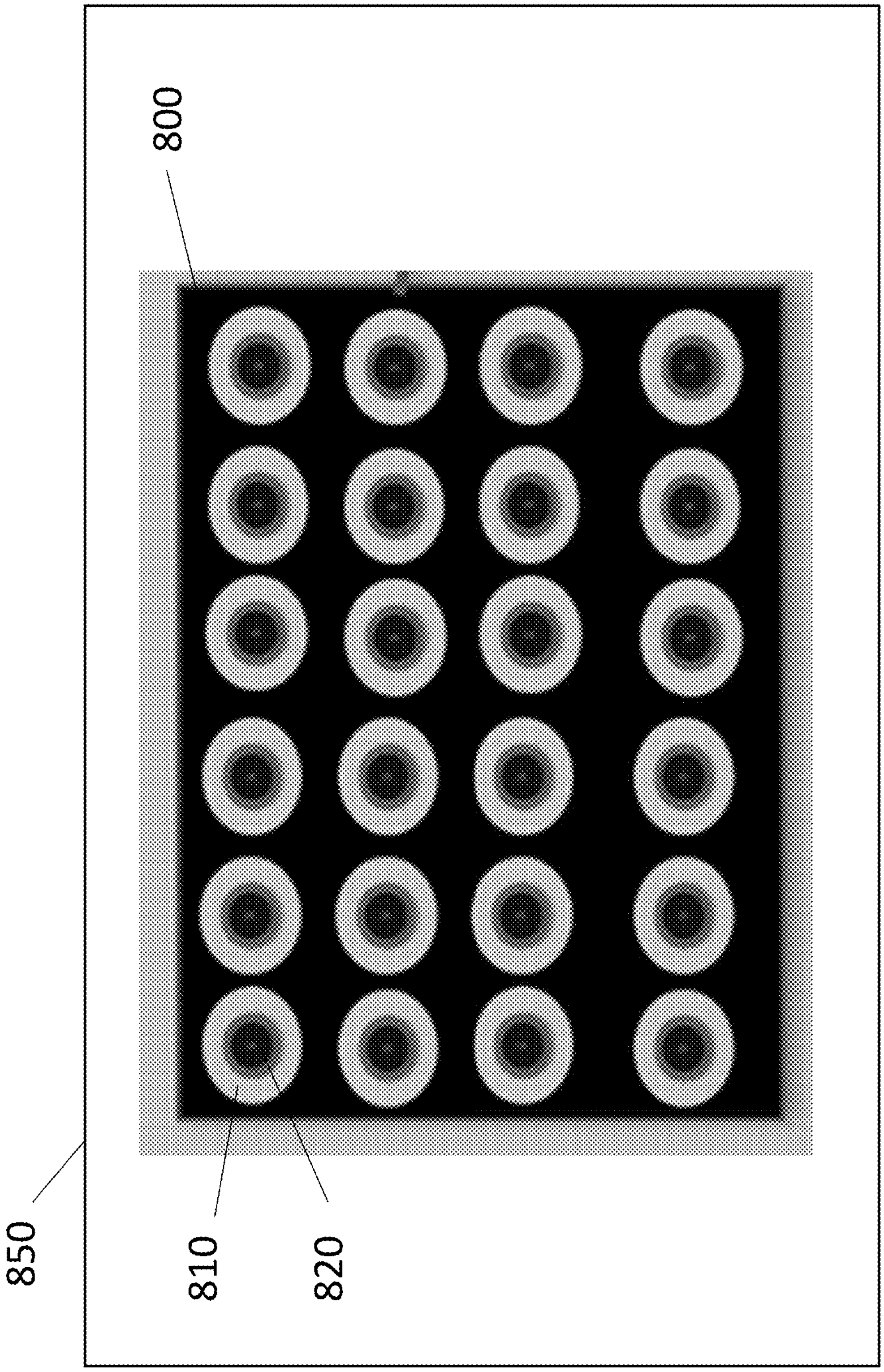
FIG. 8 shows a cross section of an example of a model structure with a slurry mixture inside the pores of the model structure, having a single HOSP particle centered in each pore.

At step 630, at least the portion of the slurry mixture is applied into the plurality of pores of the model structure by applying a pressure in the chamber at 50-250 Psi and at 25° C. For example, the 3-way valve 565 may be configured to allow for applying a pressure in the chamber 540 at 50-250 Psi and at 25° C. to cause the at least a portion of the slurry mixture 510 that submerges the model structure 550 to fill the pores of the model structure 550. At step 640, the pressure is released in the chamber after at least a portion of the slurry mixture is in the pores of the model structure. For example, the 3-way valve 565 may be configured to release the pressure in the chamber 540 after the pores of the model structure 550 are filled with the slurry mixture 510. At step 650, the model structure with at least a portion of the slurry mixture inside the plurality of pores of the model structure is dried, for example, in preparation for further processing, for example, at step 130 of method 100 in FIG. 1. An example of the model structure 800 filled with a slurry mixture 810 is shown in FIG. 8.

Figure 7:
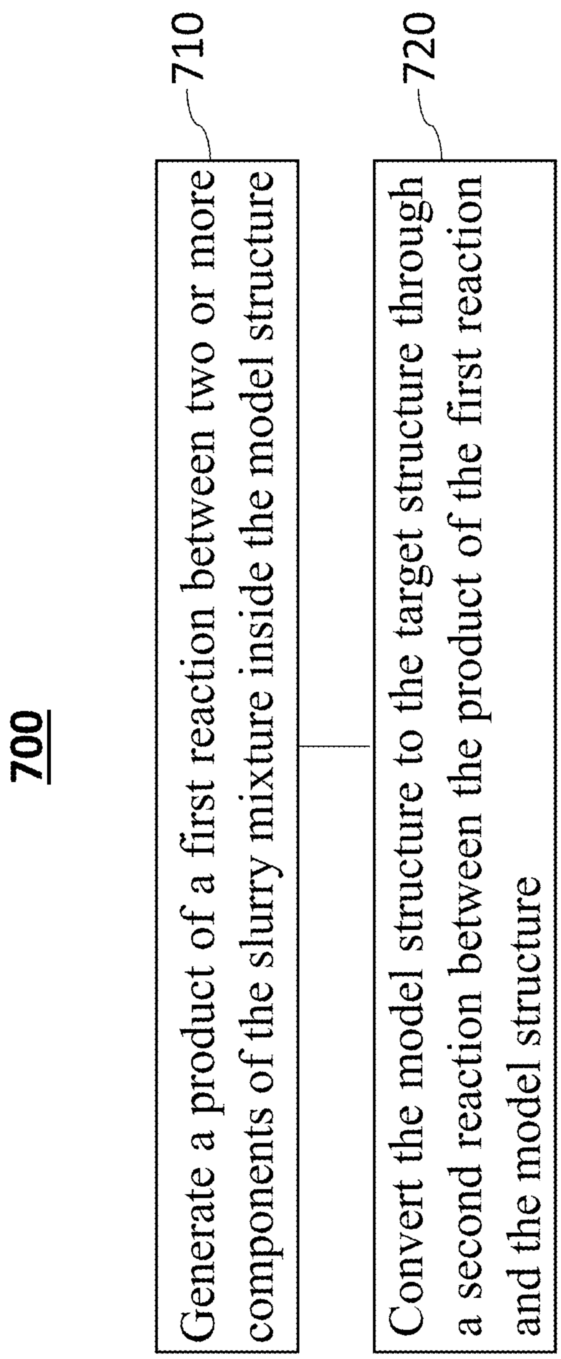
FIG. 7 is a flowchart for an example method of converting a model structure filled with a slurry mixture to a target structure made of a different material than the model structure.

FIG. 7 is a flowchart for an example method 700 of converting a model structure filled with a slurry mixture to a target structure made of a different material than the model structure. Method 700 may be an example process of implementing step 130 of method 100 in FIG. 1. In an embodiment, the model structure filled with the slurry mixture may be provided using method 600 as shown in FIG. 6. The target structure may be converted from the model structure through a series of chemical reactions based on the slurry mixture and the model structure. At step 710, a product of a first reaction between two or more components of the slurry mixture inside the model structure is generated. At step 720, the model structure is converted to the target structure through a second reaction between the product of the first reaction and the model structure. In some embodiments, each of the first reaction and the second reaction is enabled at an elevated temperature, in vacuum, or under any other suitable conditions.

For example, method 700 may be used to convert a carbon foam structure filled with a slurry mixture to a silicon carbide foam structure. The slurry mixture is a mixture of silicon, silicon dioxide, and a suspension material. In an embodiment, the slurry mixture includes a plurality of HOSPs each including one or more silicon particles coated with a silicon dioxide exterior layer having a molar ratio between silicon and silicon dioxide to be around one. The silicon dioxide exterior layer prevents the silicon particle from reacting with the carbon foam structure directly and deforming the carbon foam structure. In an embodiment, the suspension material in the slurry mixture is a sacrificial binder (or a fugitive binder) that decomposes at an elevated temperature without leaving a residue. In an embodiment, the sacrificial binder is a polymer material, for example, poly (propylene carbonate) having a chemical formula of $(C_4H_6O_3)_n$ that decomposes at around 300° C. In an embodiment, the polymer material may be a QPAC® 40 product.

At step 710, a silicon monoxide gas is generated by a first reaction between silicon and silicon dioxide of the slurry mixture inside the model structure. In an embodiment, the first reaction of $S_i+S_iO_2=2S_iO(g)$ occurs in a vacuum chamber of a furnace at 1200° C. or above in vacuum (<10 mTorr). In an embodiment, the furnace supplies heat to maintain the temperature in the vacuum chamber at 1200° C. or above. In some embodiments when silicon and silicon dioxide in the slurry mixture are provided in form of HOSPs having a molar ratio to be around 1, the HOSPs in the slurry mixture may be fully utilized to generate the silicon monoxide gas without a waste. The silicon monoxide gas fills the carbon foam structure and further reacts with the carbon foam structure, at step 720, to convert the carbon foam structure to a silicon carbide foam structure through a second reaction of $S_iO(g)+2C=S_iC+CO(g)$. Because a carbon atom and a silicon atom have similar sizes, the silicon carbide foam structure has a geometry and dimensions that are substantially similar to the carbon foam structure, and the dimensional features of the model structure are maintained and not damaged during this conversion. In addition, since the polymer material in the slurry mixture decomposes at 300° C., leaving no residue.

FIG. 8 shows a cross section of an example of a model structure 800 having pores 810 each filled with a slurry mixture 820 and placed in a furnace 850. In this example, the model structure 800 includes a plurality of pores 810 arranged in an array with each pore 810 filled with the slurry mixture 820. However, the plurality of pores 810 may be provided in any arrangement. In an embodiment, the model structure 800 is a carbon foam structure. In an embodiment, the model structure 800 is a silicon carbide foam structure. The furnace 850 may include a vacuum chamber and may be configured to process the model structure 800 in accordance with step 130 of method 100 in FIG. 1, method 700 in FIG. 7, step 1030 of method 1000 in FIG. 10, method 1100 in FIG. 11, and step 1330 of method 1300 in FIG. 13.

Figure 9A:
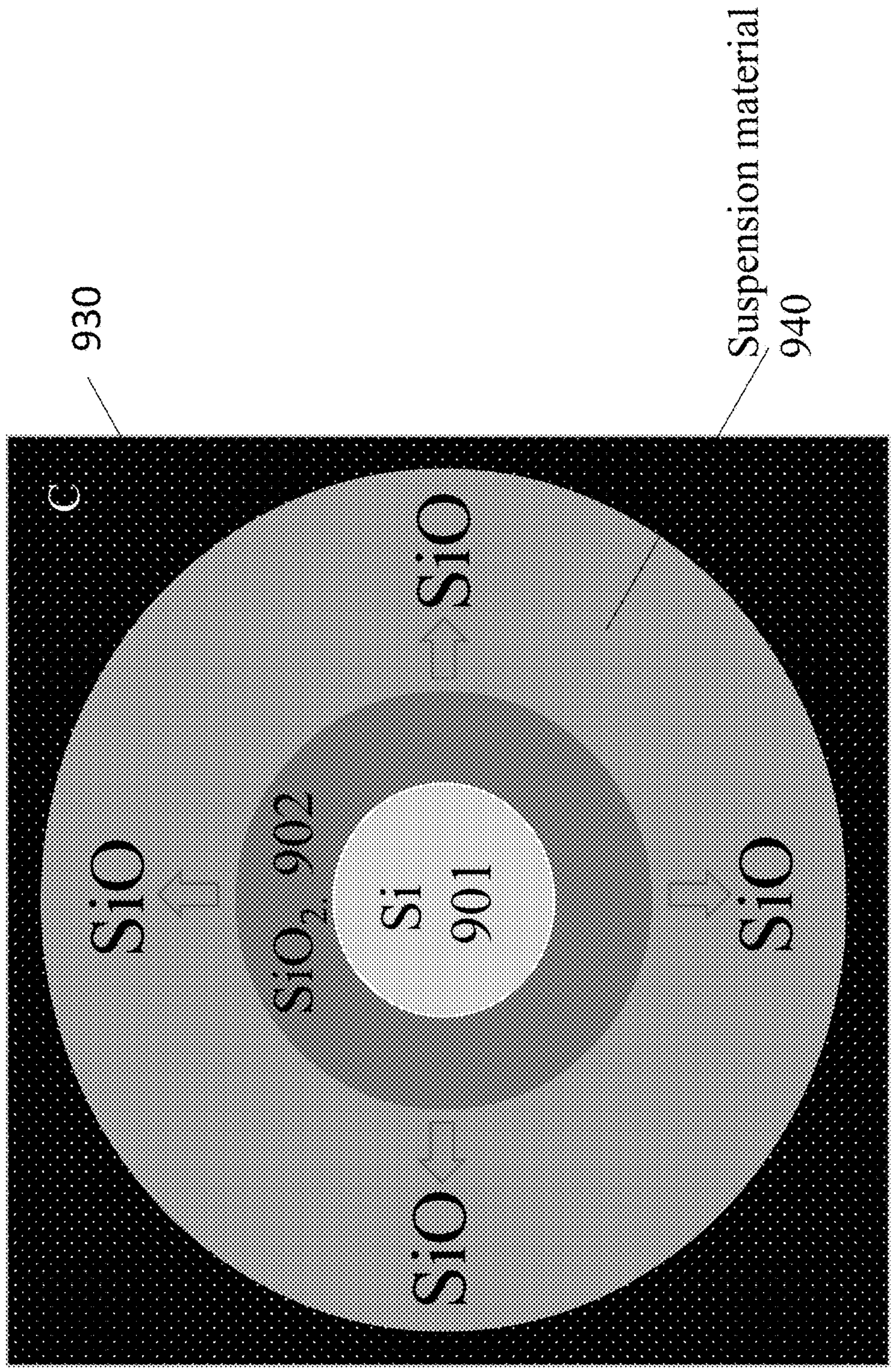
FIGS. 9A and 9B depict an illustration showing an example process of converting a carbon foam structure to a silicon carbide foam structure.
Figure 9B:
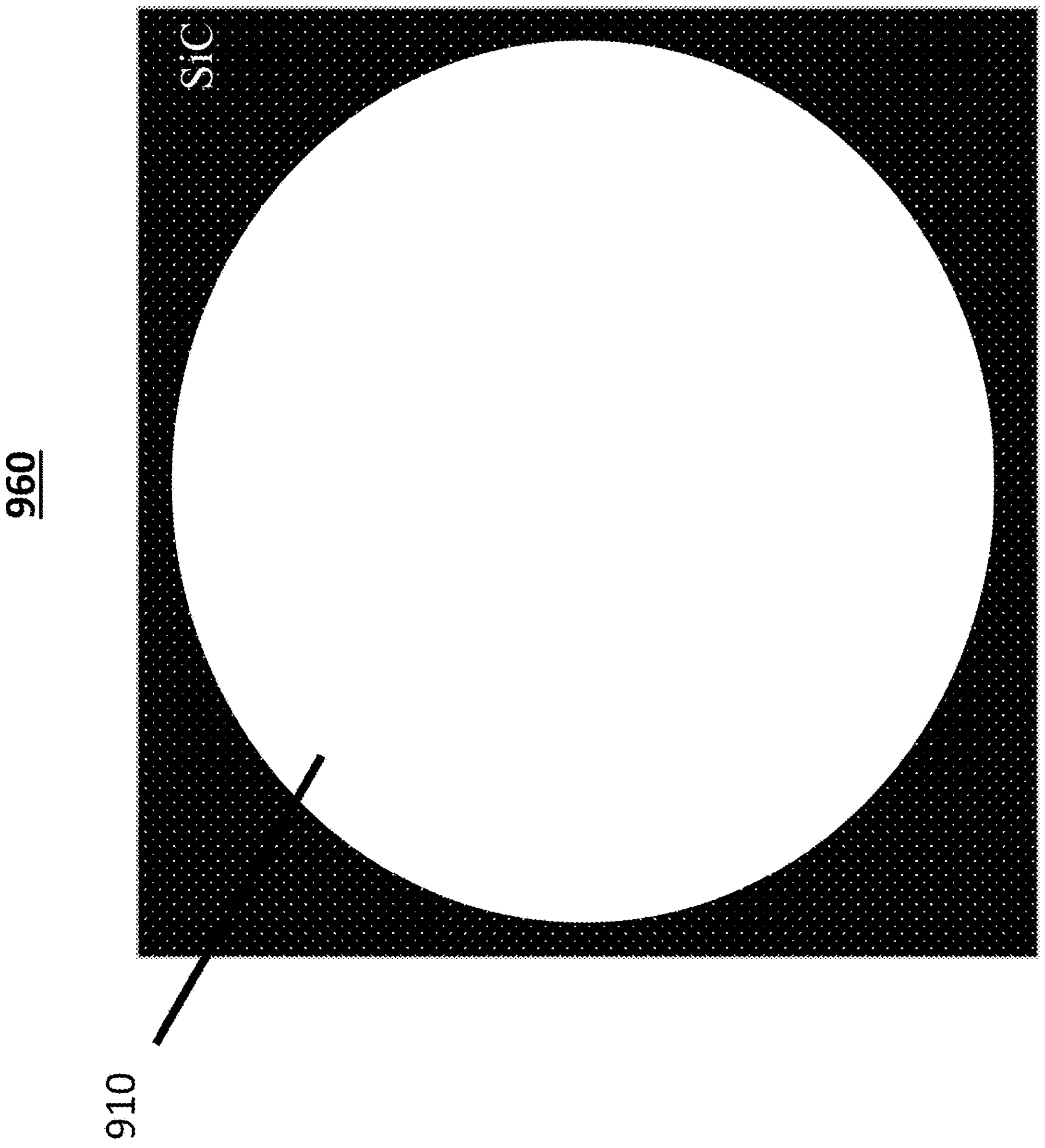

FIGS. 9A and 9B depict an illustration showing an example process of converting a carbon foam structure 930 to a silicon carbide foam structure 960. In this example, the model structure 800 in FIG. 8 is a carbon foam structure, and the carbon foam structure 930 in FIGS. 9A and 9B including a single pore 910 filled with a slurry mixture containing an idealized single HOSP and a suspension material 940. The boundary of the single pore in FIG. 9A is the boundary between material 930 and 940. The structures shown in FIGS. 9A and 9B may be a portion of the carbon foam structure 800 for ease of illustration. The HOSP including one or more silicon particles 901 coated with a silicon dioxide exterior layer 902 has a molar ratio between silicon and silicon dioxide to be around 1. In an embodiment, the suspension material 940 is a sacrificial binder that encloses the HOSP and decomposes at an elevated temperature without leaving a residue. As shown in FIG. 9A, the HOSP includes one silicon particle 901 coated with the silicon dioxide exterior layer 902. In some embodiments, the HOSP may include two or more silicon particle 901 coated with a silicon dioxide exterior layer 902. In some embodiments, the single pore 910 may be filled with the slurry mixture of two or more HOSPs enclosed by the suspension material 940. In an embodiment, the suspension material 940 is a polymer material, for example, poly (propylene carbonate) having a chemical formula of $(C_4H_6O_3)_n$ that decomposes at around 300° C.

As shown in FIGS. 9A and 9B, the silicon particle 901 and the silicon dioxide exterior layer 902 are contained within the pore 910 along with a suspension material 940. As the suspension material 940 decomposes at around 300° C., the suspension material 940 leaves no residue in the pore 910. The silicon particle 901 and the silicon dioxide exterior layer 902 then react to generate a silicon monoxide gas at a temperature of at least 1200° C. in vacuum (<10 mTorr) inside the vacuum chamber of the furnace 850. The silicon monoxide gas fills the carbon foam structure 930 and converts it to the silicon carbide foam structure 960 as shown in FIG. 9B while releasing a carbon monoxide gas. The silicon carbide foam structure 960 as shown in FIG. 9B has a geometry and dimensions similar to the carbon foam structure 930.

Figure 10:
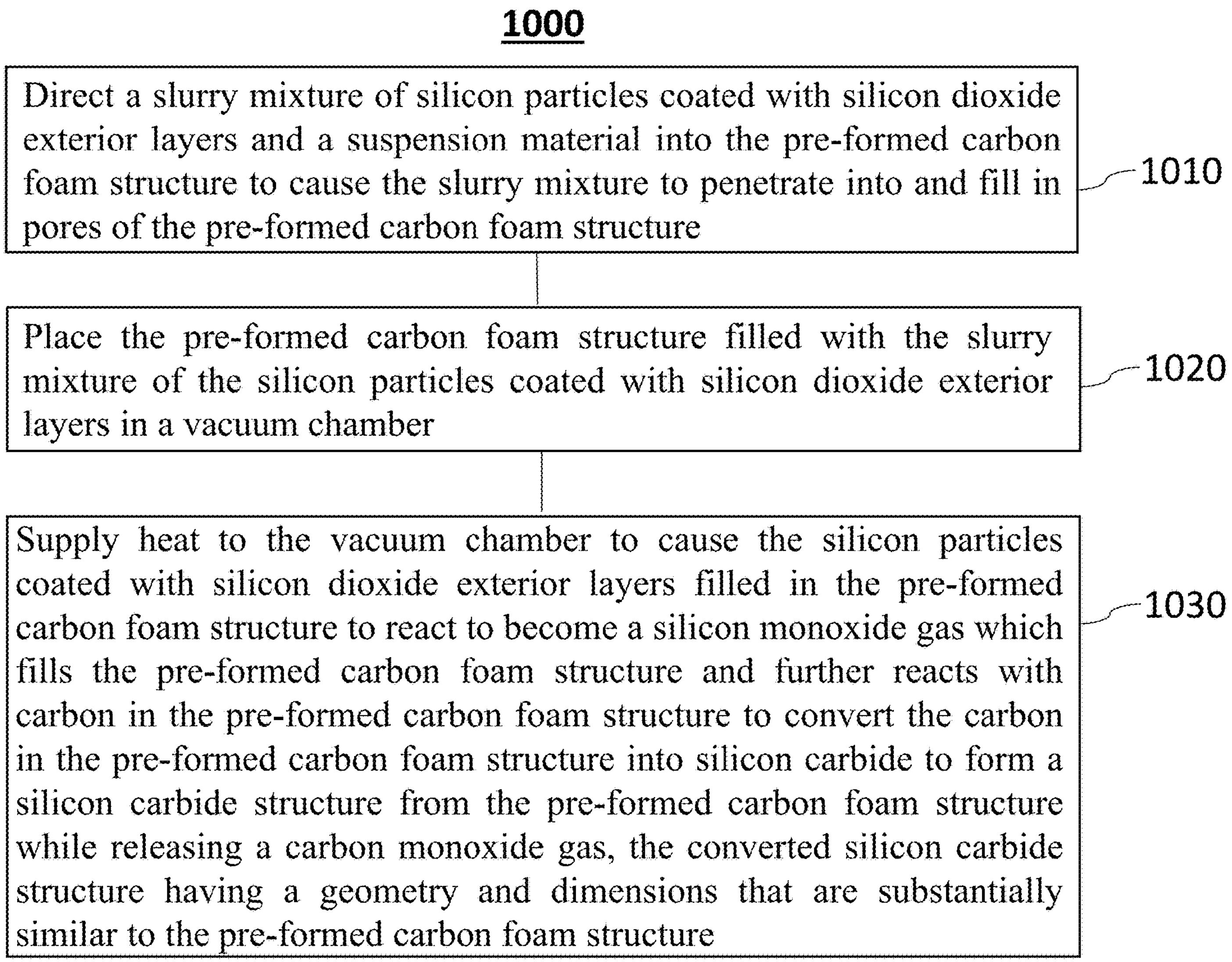
FIG. 10 is a flowchart for an example method of fabricating a silicon carbide foam structure by using a pre-formed carbon foam structure in a desired geometry and dimensions.

FIG. 10 is a flowchart for an example method of fabricating a silicon carbide foam structure by using a pre-formed carbon foam structure in a desired geometry and dimensions. At step 1010, a slurry mixture of silicon particles coated with silicon dioxide exterior layers and a suspension material is directed into the pre-formed carbon foam structure to cause the slurry mixture to penetrate into and fill in pores of the pre-formed carbon foam structure. In an embodiment, step 1010 may be implemented by the infiltrator 500 as shown in FIG. 5. In an embodiment, the suspension material is a polymer material, for example, poly (propylene carbonate) having a chemical formula of $(C_4H_6O_3)_n$ that decomposes at around 300° C.

At step 1020, the pre-formed carbon foam structure filled with the slurry mixture of the silicon particles coated with silicon dioxide exterior layers is placed in a vacuum chamber of a furnace. In an embodiment, the furnace may be the furnace 850 in FIG. 8. At step 1030, heat is supplied to the vacuum chamber to cause the silicon particles coated with silicon dioxide exterior layers filled in the pre-formed carbon foam structure to react to become a silicon monoxide gas which fills the pre-formed carbon foam structure and further reacts with carbon in the pre-formed carbon foam structure to convert the carbon in the pre-formed carbon foam structure into silicon carbide to form a silicon carbide structure from the pre-formed carbon foam structure while releasing a carbon monoxide gas. The converted silicon carbide structure has a geometry and dimensions that are substantially similar to the pre-formed carbon foam structure. In an embodiment, step 1030 is performed by a furnace, for example, the furnace 850.

Figure 11:
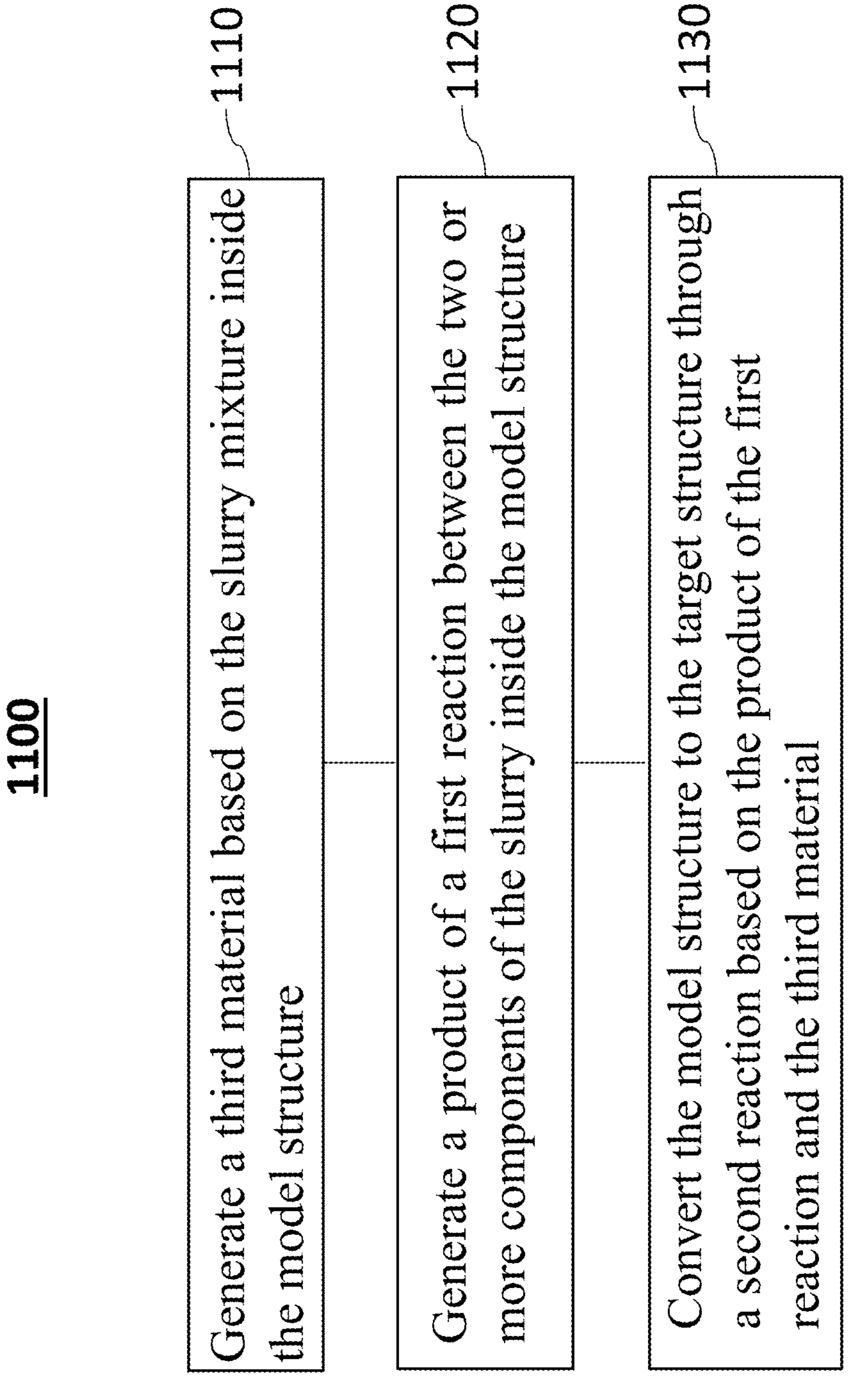
FIG. 11 is a flowchart for an example method of densifying a model structure to provide a target structure by processing the model structure filled with a resin slurry mixture that generates a third material after undergoing the slurry heat treatment.

FIG. 11 is a flowchart for an example method 1100 of densifying a model structure to provide a target structure by processing the model structure filled with a slurry mixture. Method 700 may be an example process of implementing step 130 of method 100 in FIG. 1. In an embodiment, the model structure filled with the slurry mixture may be provided using method 600 as shown in FIG. 6. The target structure may be converted from the model structure through a series of chemical reactions based on the components in the slurry mixture. At step 1110, a third material is generated based on the slurry mixture inside the model structure. At step 1120, a product of a first reaction between the two or more components of the slurry inside the model structure is generated. In some embodiments, this step is similar to step 710 of method 700 in FIG. 7. At step 1130, the model structure is converted to the target structure through a second reaction based on the product of the first reaction and the third material. In some embodiments, the first reaction, the second reaction, and the generation of the third material each occur at an elevated temperature, in vacuum, or under any other suitable conditions. In some embodiments, the first reaction, the second reaction, and the generation of the third material do not occur under the same conditions. In some embodiments, the first reaction and the second reaction occur under the same conditions, but the generation of the third material occurs under a different condition.

For example, method 1100 may be used to form a densified silicon carbide structure based on a silicon carbide foam structure filled with a slurry mixture. In an embodiment, method 1100 may be implemented in a vacuum chamber of a furnace, for example, the furnace 850. In an embodiment, the slurry mixture is a mixture of silicon, silicon dioxide, and a carbon-producing resin. In an embodiment, the carbon-producing resin may be converted to a residual-carbon structure at around 900° C. or between 900° C. and 1200° C. with a flowing argon, nitrogen, or other inert gas around the carbon producing resin. In an embodiment, the slurry mixture includes a plurality of HOSPs having a molar ratio between silicon and silicon dioxide to be around one. In an embodiment, the molar ratio of the carbon produced from the heat treatment of the resin and the total silicon in the HOSPs (from both the silicon and silicon dioxide forms) is around one. In an embodiment, each HOSP includes one or more silicon particles coated with a silicon dioxide exterior layer.

At step 1110, residual-carbon structures are generated from the heat treatment of the carbon-producing resin contained inside the pores of the silicon carbide foam structure at around 900° C. or between 900° C. and 1200° C. with a flowing argon, nitrogen, or other inert gas around the carbon-producing resin in the vacuum chamber of the furnace. In an embodiment, the carbon structures are carbon foam structures. After step 1110 is complete, the inert gas is stopped from flowing into the vacuum chamber, and the furnace may supply heat and increase the temperature in the vacuum chamber to around 1200° C. or above in vacuum (<10 mTorr). At step 1120, a silicon monoxide gas is generated by a first reaction between silicon and silicon dioxide in the slurry mixture inside the model structure. In an embodiment, the first reaction of $S_i+S_iO_2=2S_iO(g)$ occurs in a vacuum chamber of a furnace at 1200° C. or above in vacuum (<10 mTorr). When silicon and silicon dioxide in the slurry mixture are provided in form of HOSPs having a molar ratio to be around 1, the HOSPs in the slurry mixture may be fully utilized to generate the silicon monoxide gas without a waste. The silicon monoxide gas fills the pores of the silicon carbon foam structure and further reacts with the generated residual-carbon structures, at step 1130, to convert the generated residual-carbon structures to silicon carbide structures inside the pores through a second reaction of $S_iO(g)+2C=S_iC+CO(g)$. Because one mole of carbon has volume (6 cc/mol) of almost one half the volume of one mole of silicon carbide (12.1 cc/mol), when 2 moles of carbon (12 cc) convert to 1 mole of silicon carbide (12.1 cc), the silicon carbide foam structure has a geometry and dimensions that are substantially similar to the carbon structure. The silicon carbide structures converted from the residual-carbon structures may fill at least a portion of the respective pore, reducing the pore sizes and increasing the density of the silicon carbide foam structure without substantially changing the geometry and dimensions of the silicon carbide foam structure. In some embodiments, the silicon carbide structures converted from the residual-carbon structures may fill the pores completely, transforming the silicon carbide foam structure to a solid silicon carbide structure.

Figure 12A:
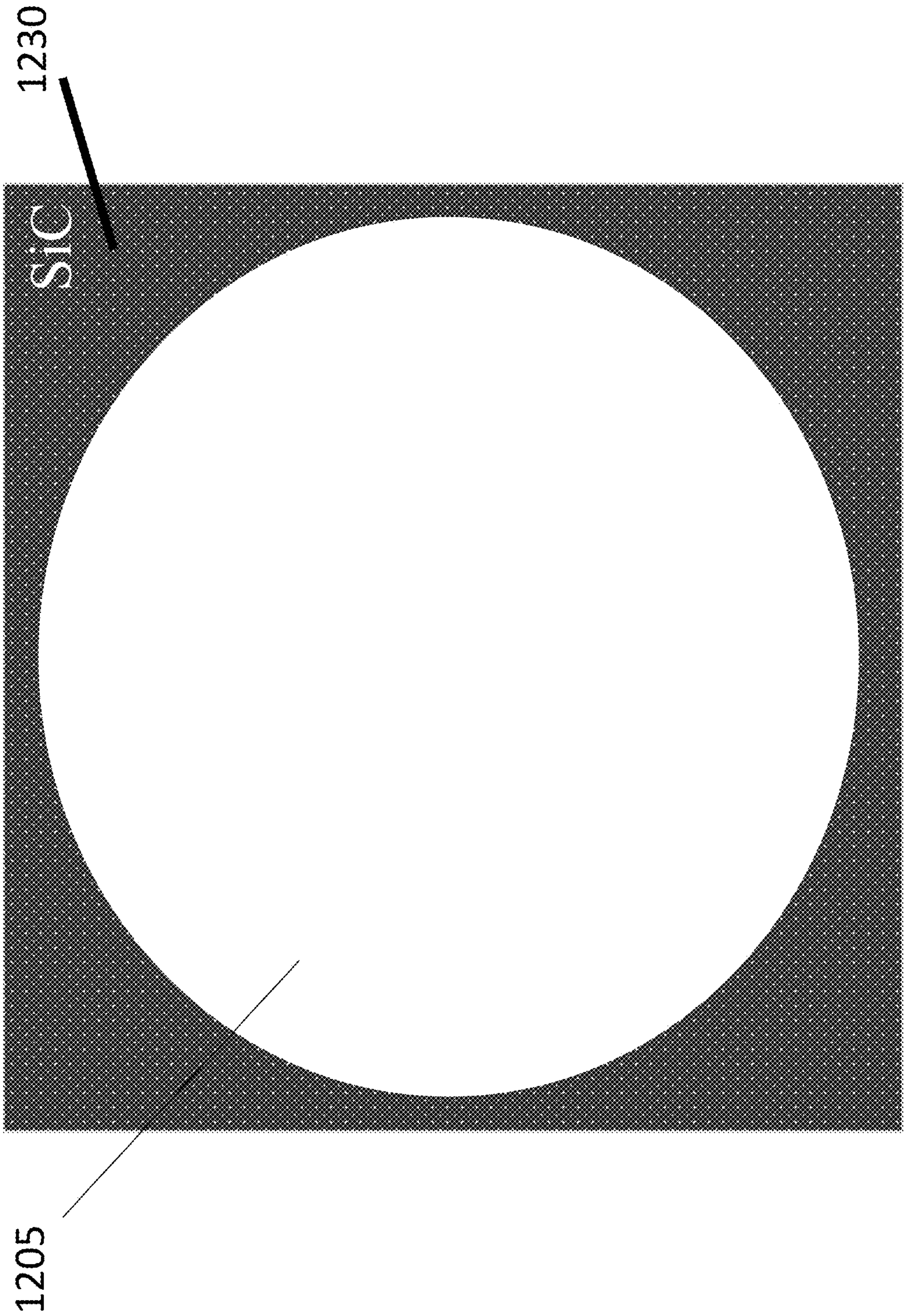
FIGS. 12A, 12B, 12C and 12D depict an illustration showing an example process of forming a densified silicon carbide structure.
Figure 12B:
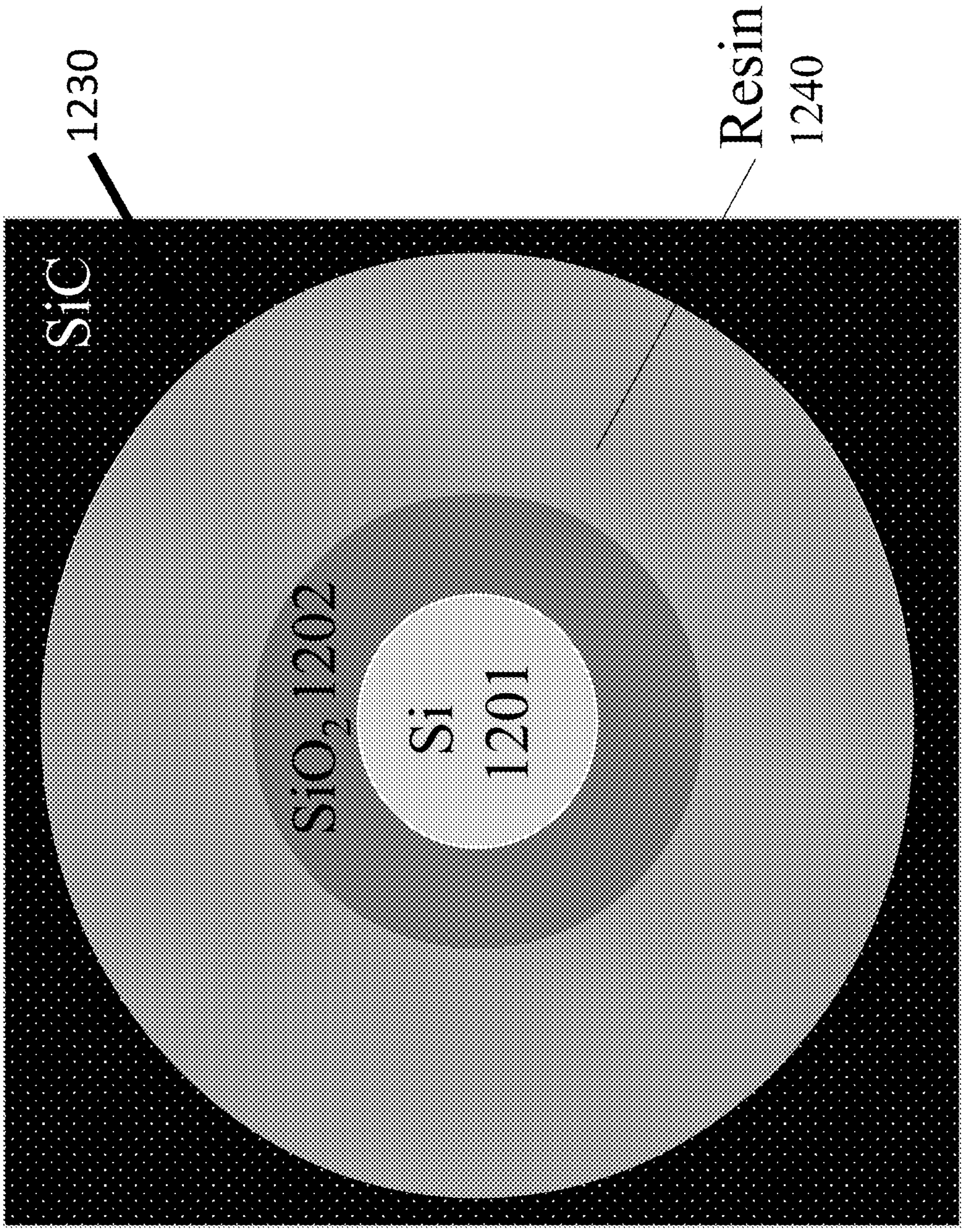
Figure 12C:
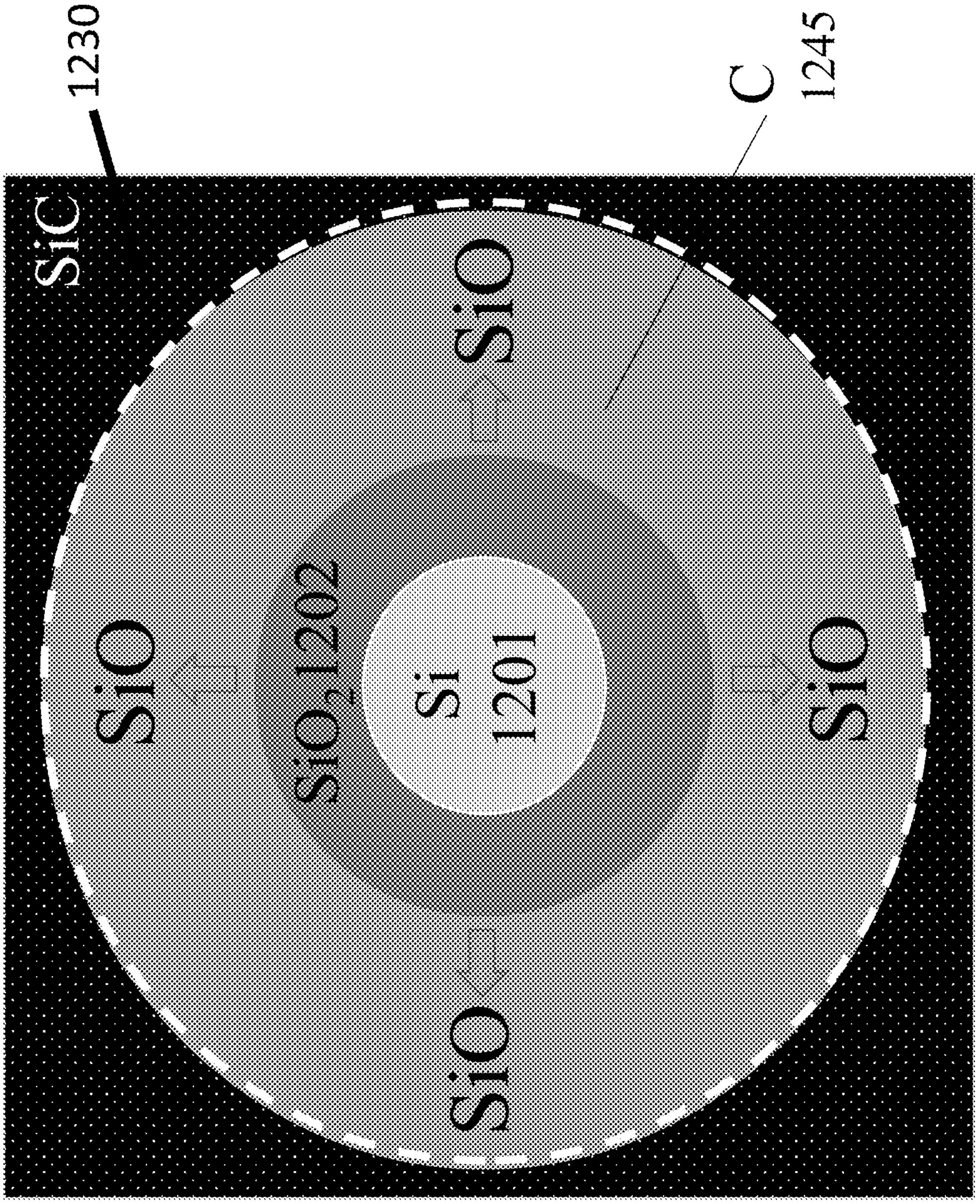

FIGS. 12A-12D depict an illustration showing an example process of converting a silicon carbide foam structure 1230 to a densified silicon carbide structure 1260. In some embodiments, the process may be performed in a vacuum chamber of a furnace, for example, the furnace 850. In this example, the model structure 800 in FIG. 8 is a silicon carbide foam structure, and the silicon carbide foam structure 1230 in FIGS. 12B-12C including a single pore 1205 (as marked in FIG. 12A and shown in FIGS. 12A-12C) filled with a slurry mixture of one or multiple silicon particles 1201 coated with a silicon dioxide exterior layer 1202 and a carbon-producing resin 1240. The structures shown in FIGS. 12A-12D may be a portion of the silicon carbide foam structure 800 for ease of illustration. As shown in FIGS. 12B and 12C, the silicon particle 1201 coated with the silicon dioxide exterior layer 1202 forms an HOSP having a molar ratio between silicon and silicon dioxide to be around 1. In some embodiments, the single pore 1210 may be filled with the slurry mixture of two or more HOSPs enclosed by the carbon-producing resin 1240. In an embodiment, the carbon-producing resin 1240 may be converted to residual-carbon material at around 900° C. or between 900° C. and 1200° C. with a flowing argon, nitrogen, or other inert gas around the carbon-producing resin.

Figure 12D:
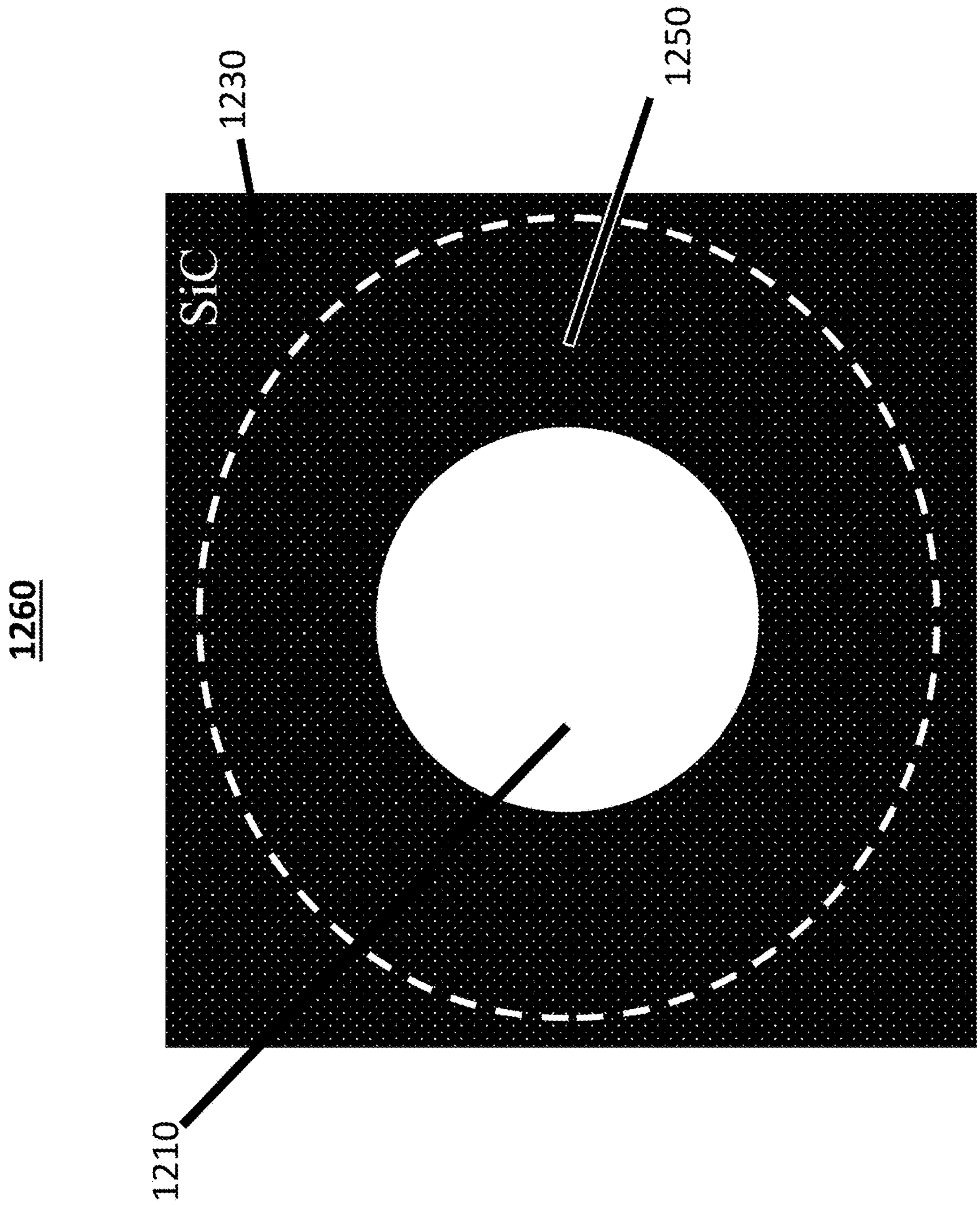

As shown, the carbon-producing resin 1240 in FIG. 12B may be converted to a residual-carbon structure 1245 in the pore 1205 (as marked in FIG. 12A and shown in FIGS. 12A-12C) of the silicon carbon foam structure 1230 as shown in FIG. 12C at around 900° C. or between 900° C. and 1200° C. with the flowing inert gas around the carbon-producing resin 1240 in the vacuum chamber of the furnace 850. After the carbon structure 1245 is formed, the argon or other inert gas is stopped from flowing into the vacuum chamber of the furnace 850, and the furnace 850 may supply heat to increase the temperature in the vacuum chamber to around 1200° C. or above in vacuum (<10 mTorr), when the silicon particle 1201 and the silicon dioxide exterior layer 1202 react to generate a silicon monoxide gas. As the molar ratio between silicon and silicon dioxide is about one, the HOSP may be fully utilized to generate the silicon monoxide gas without a waste. The silicon monoxide gas fills the silicon carbide foam structure 1230 to further react with the residual-carbon structure 1245 and converts it to the silicon carbide structure 1250 as shown in FIG. 12C while releasing a carbon monoxide gas. The silicon carbide structure 1250 as shown in FIG. 12C has a geometry and dimensions similar to the residual-carbon structure 1245. With the addition of the generated silicon carbide structure 1250 inside the pore 1205, the final silicon carbide structure 1260 as shown in FIG. 12D has a reduced size of the pore 1210 in FIG. 12D (vs pore 1205 in FIG. 12A) and a greater density than the silicon carbide foam structure 1230 in FIG. 12A, while maintaining a geometry and dimensions substantially similar to the silicon carbide foam structure 1230 in FIG. 12A when viewed from the outside.

Figure 13:
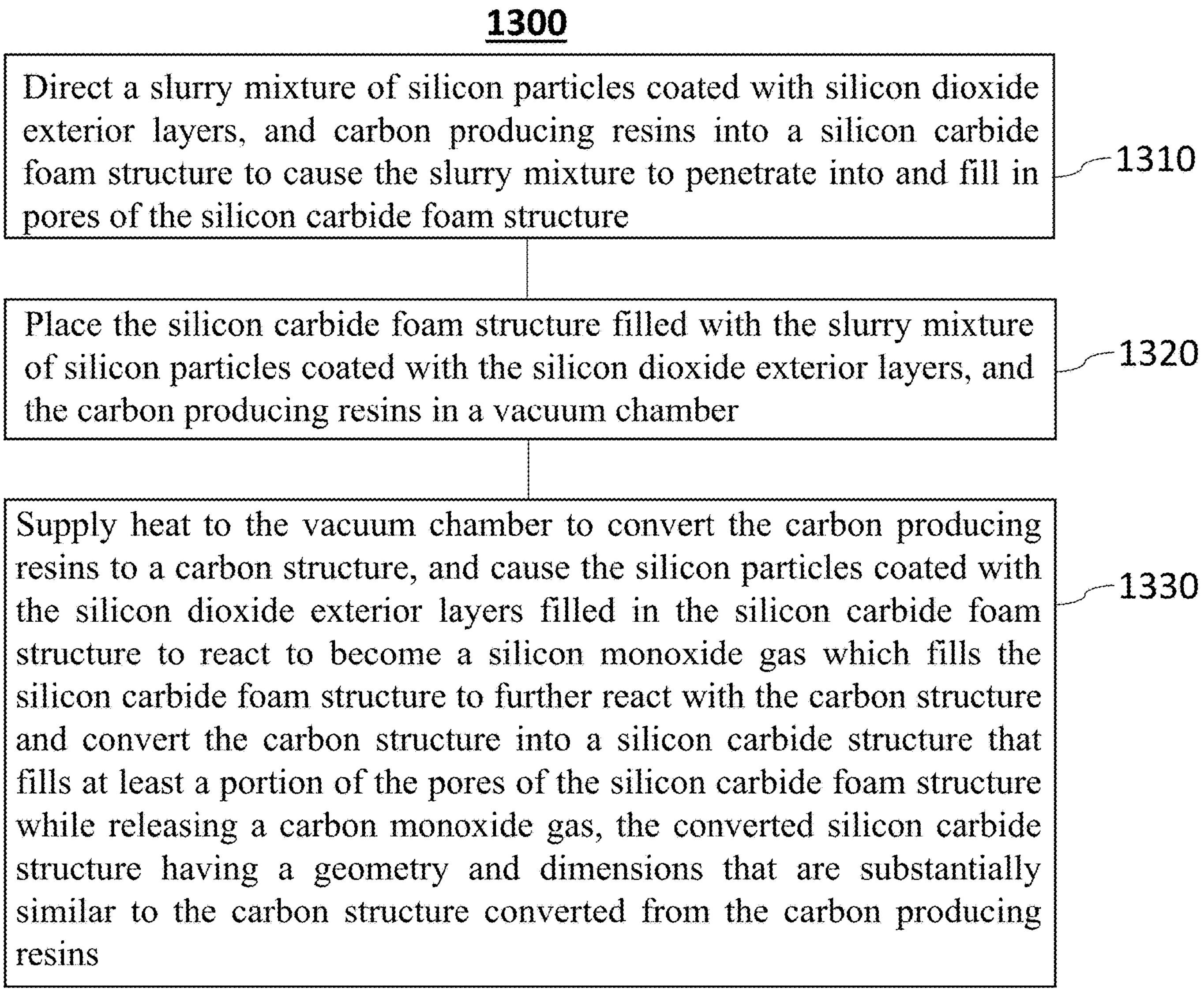
FIG. 13 is a flowchart for an example method of forming a densified silicon carbide structure.

FIG. 13 is a flowchart for an example method 1300 of forming a densified silicon carbide structure. At step 1310, a slurry mixture of silicon particles coated with silicon dioxide exterior layers, and carbon-producing resins is directed into a silicon carbide foam structure to cause the slurry mixture to penetrate into and fill in pores of the silicon carbide foam structure. In an embodiment, step 1310 may be implemented by the vacuum infiltrator 500 as shown in FIG. 5. In an embodiment, the carbon-producing resins may be converted to residual-carbon at around 900° C. or between 900° C. and 1200° C. with a flowing argon gas around the carbon-producing resins.

At step 1320, the silicon carbide foam structure filled with the slurry mixture of silicon particles coated with the silicon dioxide exterior layers, and the carbon-producing resins is placed in a vacuum chamber of a furnace. In an embodiment, the furnace may be the furnace 850 in FIG. 8. At step 1330, heat is supplied to the vacuum chamber to convert the carbon-producing resins to a residual-carbon structure, and cause the silicon particles coated with the silicon dioxide exterior layers filled in the silicon carbide foam structure to react to become a silicon monoxide gas which fills the silicon carbide foam structure to further react with the residual-carbon structure and convert the residual-carbon structure into a silicon carbide structure that fills at least a portion of the pores of the silicon carbide foam structure while releasing a carbon monoxide gas. The converted silicon carbide structure has a geometry and dimensions that are substantially similar to the residual-carbon structure converted from the carbon-producing resins. In an embodiment, step 1330 is performed by a furnace, for example, the furnace 850. In an embodiment, the furnace may supply heat to the vacuum chamber and maintain the temperature inside the vacuum chamber to around 900° C. or between 900° C. and 1200° C. until the carbon producing resins are fully converted to residual-carbon. Then the furnace may further increase the temperature inside the vacuum chamber to at least 1200° C. to cause the silicon particles to react with silicon dioxide to generate the silicon monoxide gas, which further reacts with the generated residual-carbon, and converts the generated residual-carbon structure to be the silicon carbide structure.

In light of the disclosure in this patent document, the fabrication method by using a preform may be implemented to offer a novel solution address some key issues in fabrication of high strength silicon carbide and other materials. Several examples are provided below.

a. Near net shape processing of SiC and other ceramic components. The disclosed fabrication technology can be used to overcome the problem that ceramics such as SiC are hard and very difficult to machine into target geometries with precision. The disclosed fabrication technology can be used to enable lower-cost machining of softer carbon foam structures which can subsequently be converted into SiC or another ceramic using this method.

b. No degradation of the original foam structure. The disclosed fabrication technology can be used to over the problem caused by volumetric and density changes which typically accompany phase and compositions changes. For example, carbon easily reacts with silicon to form SiC at elevated temperatures, and this causes the volume to roughly double, leading to structural damage. Using the disclosed technology, the silicon is encapsulated with a $SiO_2$ layer, preventing early reaction and conversion to SiC. Additionally, once the Si and $SiO_2$ react to form SiO gas, the conversion of carbon and SiO gas to SiC occurs with negligible volumetric change, allowing fine dimensional features and geometries to remain intact.

c. Densification and strengthening of porous ceramics. The disclosed technology can be used to overcome the performance impact caused by pores within a ceramic such as silicon carbide. This method enables ceramic materials such as SiC to be deposited within pores of an existing structure, increasing the density, strength, thermal conductivity, and other proprieties. The number of process cycles can be controlled to tailor the density and properties.

d. In-situ generation of reactive gases. This fabrication technology can be used to overcome the problem of having to externally introduce reactive gases into a preform to achieve a desired conversion. For example, reactive SiO gas are commonly flowed through a structure from one side to the other or outside to inside. This external introduction of the gas causes non-uniform conversion and wastes gases. The SiO gas concentration is different at different position of the part, which will cause silicon carbide crystal growth at different speeds. Some of the SiO gas will not flow into part, and waste SiO gas needs to be absorbed by active carbon, to prevent formation of silicon and silicon dioxide in the processing equipment, causing very heavy maintenance work. The disclosed fabrication technology generates reactive gases in-situ where they can directly react with the structure and do not require transport over larger distances to reach all pores within the structure. The internal gas generation allows for extremely uniform access of the gas to all surfaces, reacting a uniform conversion or densification, and therefore a highly uniform density final structure. The in-situ gas generation also occurs at relatively low temperatures, reducing process costs.

e. Formation of pure, stoichiometric ceramic materials. This overcomes the problem of introducing multiple, distinct reactive species which cannot be perfectly blended and distributed. This causes some regions to be compositionally rich in one reactant and deficient in another reactant, leading to compositional and stoichiometric variation. For example, when using Si and $SiO_2$, due to poor contact between particles, mixed particles need to be heated to high temperature (close to silicon melting point of 1414° C.) to have good contact to cause reaction between two particles to generate SiO gas. The disclosed fabrication technology can be used to allow for careful control of the molar ratio of the reactive species and combines the reactants into a single component (half-oxidized silicon particles), ensuring all needed reactant species are uniformly distributed, in intimate contact, and are co-located in the desired ratio.

The disclosed fabrication process may be implemented to obtain high uniformity materials. With respect to the uniformity of the material derived from the reaction of the HOSPs, this resulting material is compositionally uniform, having phase purity at a high level, for example, greater than 95% and any free Si in the model structure is dispersed throughout the material. The material derived from the reaction of the HOSPs is a crystalline material, with a low amorphous content (e.g., below 5%). In the case that the pores of the model structure are of equivalent size and distribution, are open and interconnecting through the model structure, and are larger than the size of the HOSPs, the disclosed technology can be used to uniformly distribute the HOSPs within the target structure and as a result the final target structure will have consistent density throughout the material.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various components in the embodiments described in this patent document should not be understood as requiring such separation in all embodiments.

Only a few implementations and examples are described, and other implementations enhancements and variations can be made based on what is described and illustrated in this patent document.

What is claimed are techniques and structures as described and shown, including:

1. A method of manufacturing a target structure, comprising:

obtaining a model structure of an initial material composition having a predetermined geometry and dimensions;

applying a slurry mixture into the model structure, wherein the slurry mixture comprises silicon particles coated with silicon dioxide exterior layers; and processing the model structure with the slurry mixture inside the model structure to convert the initial material composition of the model structure into a final material composition to obtain the target structure with the final material composition and having a geometry and dimensions that are substantially similar to the predetermined geometry and dimensions of the model structure, wherein the processing comprises:

generating a product including a silicon monoxide gas in-situ within the model structure from a first reaction between silicon and silicon dioxide of the slurry mixture; and converting the initial material composition to the final material composition by reacting the silicon monoxide gas with the model structure in a second reaction.

2. The method of claim 1, wherein the model structure comprises a plurality of pores, and wherein the applying the slurry mixture into the model structure comprises applying the slurry mixture into the plurality of pores of the model structure.

3. The method of claim 2, wherein the initial material composition of the model structure comprises a model material composition, and the final material composition of the target structure comprises a target material composition.

4. The method of claim 3, wherein in the slurry mixture, one or more of the silicon (Si) particles coated with the silicon dioxide ($SiO_2$) exterior layers are half oxide silicon particles (HOSP) having a molar ratio of Si to $SiO_2$ to be around one.

5. The method of claim 4, wherein generating the product of the first reaction comprises generating the silicon monoxide (SiO) gas in-situ inside the model structure by increasing a temperature around the model structure with the slurry mixture inside the model structure to over 1200° C. under 10 mTorr to allow occurrence of the first reaction between $SiO_2$ and Si of the slurry mixture inside the model structure, and wherein the first reaction is $SiO_2+Si=2SiO(g)$.

6. The method of claim 5, wherein the model structure is converted to the target structure through the second reaction between the SiO gas and C inside the model structure, wherein the second reaction is $SiO(g)+2C=CO(g)+SiC$.

7. The method of claim 4, wherein the step of applying the slurry mixture into the model structure comprises:
providing the model structure in a container in a chamber;
submerging the model structure in at least a portion of the slurry mixture by vacuuming air out of the chamber to 10-100 mTorr at 25° C. to suck the at least the portion of the slurry mixture from outside the chamber to the container in the chamber;
applying the at least the portion of the slurry mixture into the plurality of pores of the model structure by applying a pressure in the chamber at 50-250 Psi and at 25° C.;
releasing a pressure in the chamber after the at least the portion of the slurry mixture is inside the plurality of pores of the model structure; and
drying the model structure with the at least the portion of the slurry mixture inside the plurality of pores of the model structure.

8. The method of claim 3, wherein the slurry mixture further comprises a fugitive binder that decomposes at 300° C., and the model material composition is compositionally different from the target material composition.

9. The method of claim 8, wherein the fugitive binder comprises poly (propylene carbonate).

10. The method of claim 3, wherein:
the model material composition is compositionally different from the target material composition, and
the second reaction is between the product of the first reaction and the model structure.

11. The method of claim 10, wherein the model material composition is carbon (C), and the target material composition is silicon carbide (SiC).

12. The method of claim 3, wherein:
the model material composition is compositionally the same as the target material composition, and
the second reaction is between the product of the first reaction and a third material contained within the slurry mixture inside the model structure.

13. The method of claim 12, wherein the slurry mixture further comprises a carbon-producing resin that is converted to carbon as the third material at 900° C., and the density of the model structure is lower than the density of the target structure.

14. The method of claim 12, wherein:
the model material composition and the target material composition include silicon carbide materials, and
the third material is carbon.

15. The method of claim 1, further comprising:
making a volume difference between the target structure and the model structure be within five percent of a volume of the model structure.

16. The method of claim 1, wherein the target structure has a phase purity greater than 95%.

17. A method of manufacturing a target structure, comprising:
obtaining a model structure of an initial material composition having a predetermined geometry and dimensions;
applying a slurry mixture into the model structure; and
processing the model structure with the slurry mixture inside the model structure to convert the initial material composition of the model structure into a final material composition to obtain the target structure with the final material composition and having a geometry and dimensions that are substantially similar to the predetermined geometry and dimensions of the model structure, wherein:
the processing the model structure with the slurry mixture inside the model structure comprises:
generating a product of a first reaction between two or more components of the slurry mixture inside the model structure; and
converting the model structure to the target structure through a second reaction based on the product of the first reaction;
the model structure comprises a plurality of pores, and wherein the applying the slurry mixture into the model structure comprises applying the slurry mixture into the plurality of pores of the model structure;
the slurry mixture comprises one or more silicon (Si) particles coated with silicon dioxide ($SiO_2$) exterior layers that are half oxide silicon particles (HOSP) having a molar ratio of Si to $SiO_2$ to be around one; and
the Si particles coated with $SiO_2$ is are prepared by a process including:
providing a plurality of Si particles in a fluidized bed chamber;
flowing oxygen ($O_2$) over the plurality of Si particles at a temperature between 900° C. and 1100° C. in the fluidized bed chamber to cause surface oxidation of the plurality of Si particles to form $SiO_2$; and
stopping flowing $O_2$ when the molar ratio of Si to $SiO_2$ is around one.

18. The method of claim 17, further comprising:
making a volume difference between the target structure and the model structure be within five percent of a volume of the model structure.

19. The method of claim 17, wherein the target structure has a phase purity greater than 95%.

20. The method of claim 17, wherein the generating the product of the first reaction comprises generating a silicon monoxide (SiO) gas in-situ inside the model structure.

* * * * *